United States Patent
Tsutsumi et al.

(10) Patent No.: US 9,074,562 B2
(45) Date of Patent: Jul. 7, 2015

(54) FUEL SUPPLY APPARATUS, COMPUTER-READABLE STORAGE MEDIUM, AND METHOD OF CONTROLLING FUEL SUPPLY APPARATUS

(71) Applicant: Honda Motor Co., Ltd., Tokyo (JP)

(72) Inventors: Daiko Tsutsumi, Wako (JP); Hiroshi Chishima, Wako (JP); Hirotsugu Kudo, Wako (JP); Masayoshi Kawaguchi, Wako (JP); Kenji Shigetoyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 13/910,119

(22) Filed: Jun. 5, 2013

(65) Prior Publication Data

US 2014/0041642 A1 Feb. 13, 2014

(30) Foreign Application Priority Data

Aug. 13, 2012 (JP) ................. 2012-179322

(51) Int. Cl.
*F02M 31/00* (2006.01)
*F02M 31/16* (2006.01)
*F02M 31/20* (2006.01)
*F02D 19/06* (2006.01)

(52) U.S. Cl.
CPC .............. *F02M 31/00* (2013.01); *F02M 31/16* (2013.01); *F02M 31/20* (2013.01); *F02D 19/0628* (2013.01); *F02D 19/0655* (2013.01); *F02D 19/0671* (2013.01); *Y02T 10/126* (2013.01); *Y02T 10/36* (2013.01)

(58) Field of Classification Search
CPC ............ F02D 19/0655; F02D 19/0671; F02D 19/0628; F02D 19/0665; F02M 31/16

USPC ......................................... 123/548
See application file for complete search history.

(56) References Cited

U.S. PATENT DOCUMENTS

| | | | |
|---|---|---|---|
| 6,397,826 B1 * | 6/2002 | Coleman ................. | 123/541 |
| 6,711,893 B2 * | 3/2004 | Ueda et al. ................. | 60/285 |
| 6,972,093 B2 | 12/2005 | Partridge et al. | |
| 8,118,009 B2 | 2/2012 | Pursifull et al. | |
| 8,211,300 B2 | 7/2012 | Partridge et al. | |
| 8,257,583 B2 | 9/2012 | Partridge et al. | |

FOREIGN PATENT DOCUMENTS

| | | |
|---|---|---|
| JP | 2004-522039 | 7/2004 |
| JP | 2004-232624 | 8/2004 |
| JP | 2007-278298 | 10/2007 |

(Continued)

OTHER PUBLICATIONS

Japanese Office Action for corresponding JP Application No. 2012-179322, Mar. 27, 2014.

*Primary Examiner* — Lindsay Low
*Assistant Examiner* — Kevin Lathers
(74) *Attorney, Agent, or Firm* — Mori & Ward, LLP

(57) ABSTRACT

A fuel supply apparatus includes a raw-fuel tank, a separator, a heater, a cooler, and an adjustment mechanism. The raw-fuel tank is to store raw fuel. The separator is to separate the raw fuel into a first fuel and a second fuel. The adjustment mechanism is to perform adjustment of at least one of a first factor, a second factor, and a third factor so that a first temperature of the separator is set to within a predetermined first temperature range or is set to a first target temperature. The first factor includes a flow rate of the raw fuel. The second factor includes an amount by which the raw fuel is heated in the heater. The third factor includes an amount by which the second fuel is cooled in the cooler.

19 Claims, 10 Drawing Sheets

(56) References Cited

FOREIGN PATENT DOCUMENTS

| | | |
|---|---|---|
| JP | 2009-144720 | 7/2009 |
| JP | 2010-1754 | 1/2010 |
| JP | 2010-144734 | 7/2010 |
| JP | 2010-144735 | 7/2010 |
| WO | WO 02/077429 | 10/2002 |

* cited by examiner

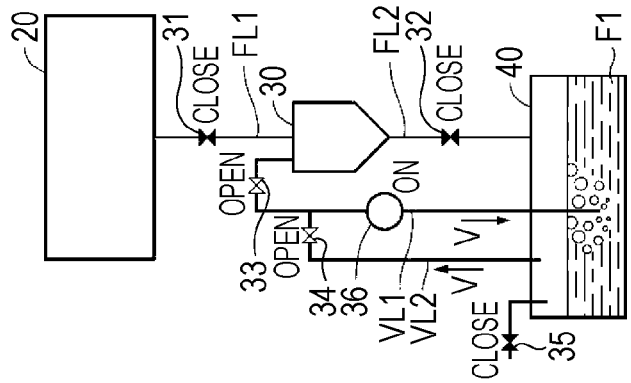
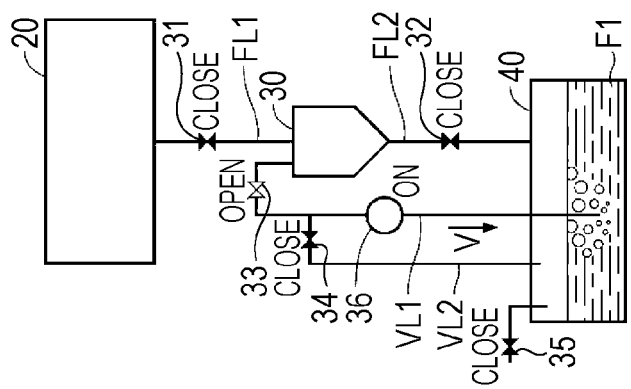
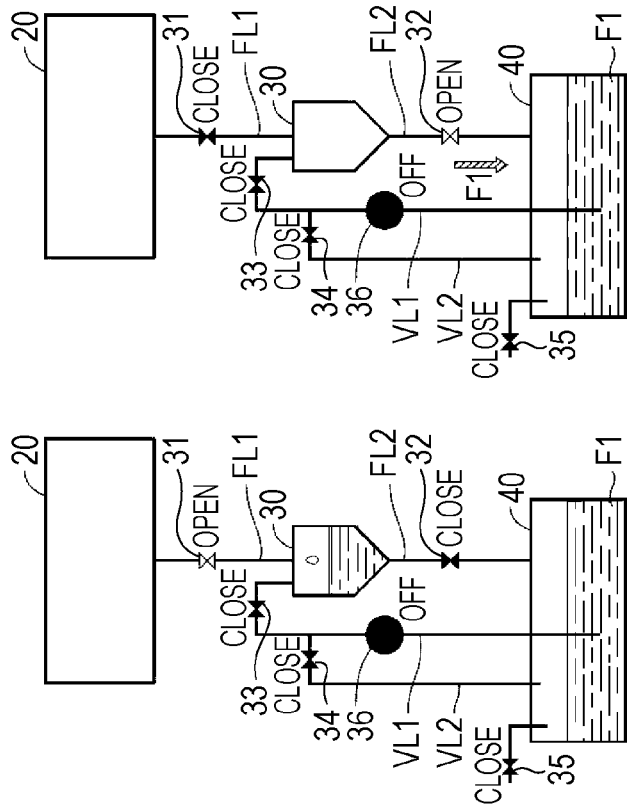

FIG. 7

|  | OPERATING SPEED | CONTROLLABILITY |
|---|---|---|
| PRESENT APPLICATION | GOOD | GOOD |
| CONTROL A IN RELATED ART | VERY GOOD | POOR |
| CONTROL B IN RELATED ART | POOR | VERY GOOD |

FUEL SUPPLY APPARATUS, COMPUTER-READABLE STORAGE MEDIUM, AND METHOD OF CONTROLLING FUEL SUPPLY APPARATUS

CROSS-REFERENCE TO RELATED APPLICATIONS

The present application claims priority under 35 U.S.C. §119 to Japanese Patent Application No. 2012-179322, filed Aug. 13, 2012, entitled "Fuel Supply Apparatus." The contents of this application are incorporated herein by reference in their entirety.

BACKGROUND OF THE INVENTION

1. Field of the Invention

The present disclosure relates to a fuel supply apparatus, a computer-readable storage medium, and a method of controlling the fuel supply apparatus.

2. Discussion of the Background

A known fuel supply apparatus in the related art separates raw fuel to produce fuel having different properties from the raw fuel and then supplies the separated fuel. An example of such a fuel supply apparatus is an apparatus equipped with a separator that separates raw fuel into high-octane fuel having a higher octane number than the raw fuel and low-octane fuel having a lower octane number than the raw fuel (see PCT Japanese Translation Patent Publication No. 2004-522039 and Japanese Unexamined Patent Application Publication No. 2009-144720)

Because the fuel separating performance (i.e., the permeability rate) is dependent on the temperature of the separator, one important issue in a fuel supply apparatus is to adjust the temperature of the separator. In this regard, an apparatus that adjusts the temperature of the separator by using, for example, a heater to preliminarily heat the fuel to be separated has been proposed (see Japanese Unexamined Patent Application Publication No. 2004-232624).

Furthermore, an apparatus that quickly increases the temperature of the separator by injecting high-octane fuel having a high evaporation temperature into the separator so as to quickly adjust the temperature when starting an engine has been proposed (see Japanese Unexamined Patent Application Publication No. 2010-144735). Another proposed apparatus properly increases the temperature of the separator by increasing the pressure of raw fuel to be supplied to the separator when the temperature of the separator is low (see Japanese Unexamined Patent Application Publication No. 2010-1754).

Furthermore, another proposed apparatus related to the above-described apparatuses is equipped with a forced discharge device for preventing the fuel from being heated excessively by the heater in the fuel supply apparatus. Specifically, the forced discharge device forcedly discharges the fuel from the heater when the temperature of the fuel in the heater is higher than or equal to a reference temperature or when the temperature of the fuel in the heater is expected to become higher than or equal to the reference temperature (see Japanese Unexamined Patent Application Publication No. 2010-144734).

SUMMARY OF THE INVENTION

According to one aspect of the present invention, a fuel supply apparatus includes a raw-fuel tank, a separator, a heater, a cooler, and an adjustment mechanism. The raw-fuel tank is to store raw fuel. The separator is to separate the raw fuel into a first fuel and a second fuel. The first fuel contains a larger amount of high-octane component than an amount of high-octane component of the raw fuel. The second fuel contains a larger amount of low-octane component than an amount of low-octane component of the raw fuel. The heater is to heat the raw fuel flowing downstream of the raw-fuel tank and upstream of the separator in a raw-fuel path along which the raw fuel is delivered from the raw-fuel tank to the separator by a raw-fuel delivery device. The cooler is to cool the second fuel flowing downstream of the separator and upstream of the raw-fuel tank in a second-fuel path along which the second fuel is delivered from the separator to the raw-fuel tank. The adjustment mechanism is to perform adjustment of at least one of a first factor, a second factor, and a third factor so that a first temperature of the separator is set to within a predetermined first temperature range or is set to a first target temperature. The first factor includes a flow rate of the raw fuel. The second factor includes an amount by which the raw fuel is heated in the heater. The third factor includes an amount by which the second fuel is cooled in the cooler.

According to another aspect of the present invention, a computer-readable storage medium stores a program for causing a computer to execute a process. In the process, adjustment of at least one of a first factor, a second factor, and a third factor is repeatedly performed with an adjustment mechanism of an fuel supply apparatus so that a first temperature of a separator of the fuel supply apparatus is set to within a predetermined first temperature range or is set to a first target temperature. The separator is provided to separate raw fuel into a first fuel and a second fuel. The first fuel contains a larger amount of high-octane component than an amount of high-octane component of the raw fuel. The second fuel contains a larger amount of low-octane component than an amount of low-octane component of the raw fuel. The first factor includes a flow rate of the raw fuel. The second factor includes an amount by which the raw fuel is heated in a heater of the fuel supply apparatus. The third factor includes an amount by which the second fuel is cooled in a cooler of the fuel supply apparatus. The computer is installed in the fuel supply apparatus and is configured to access the adjustment mechanism.

According to further aspect of the present invention, in a method of controlling a fuel supply apparatus, adjustment of at least one of a first factor, a second factor, and a third factor is repeatedly performed with an adjustment mechanism of a fuel supply apparatus so that a first temperature of a separator of the fuel supply apparatus is set to within a predetermined first temperature range or is set to a first target temperature. The separator is provided to separate raw fuel into a first fuel and a second fuel. The first fuel contains a larger amount of high-octane component than an amount of high-octane component of the raw fuel. The second fuel contains a larger amount of low-octane component than an amount of low-octane component of the raw fuel. The first factor includes a flow rate of the raw fuel. The second factor includes an amount by which the raw fuel is heated in a heater of the fuel supply apparatus. The third factor includes an amount by which the second fuel is cooled in a cooler of the fuel supply apparatus. The computer is installed in the fuel supply apparatus and is configured to access the adjustment mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3A to FIG. 3D illustrate an opening-closing process in a negative-pressure control system.

FIG. 7 is a table that compares the present application with the techniques in the related art with respect to operating speed and controllability.

DESCRIPTION OF THE EMBODIMENTS

Figure 1:
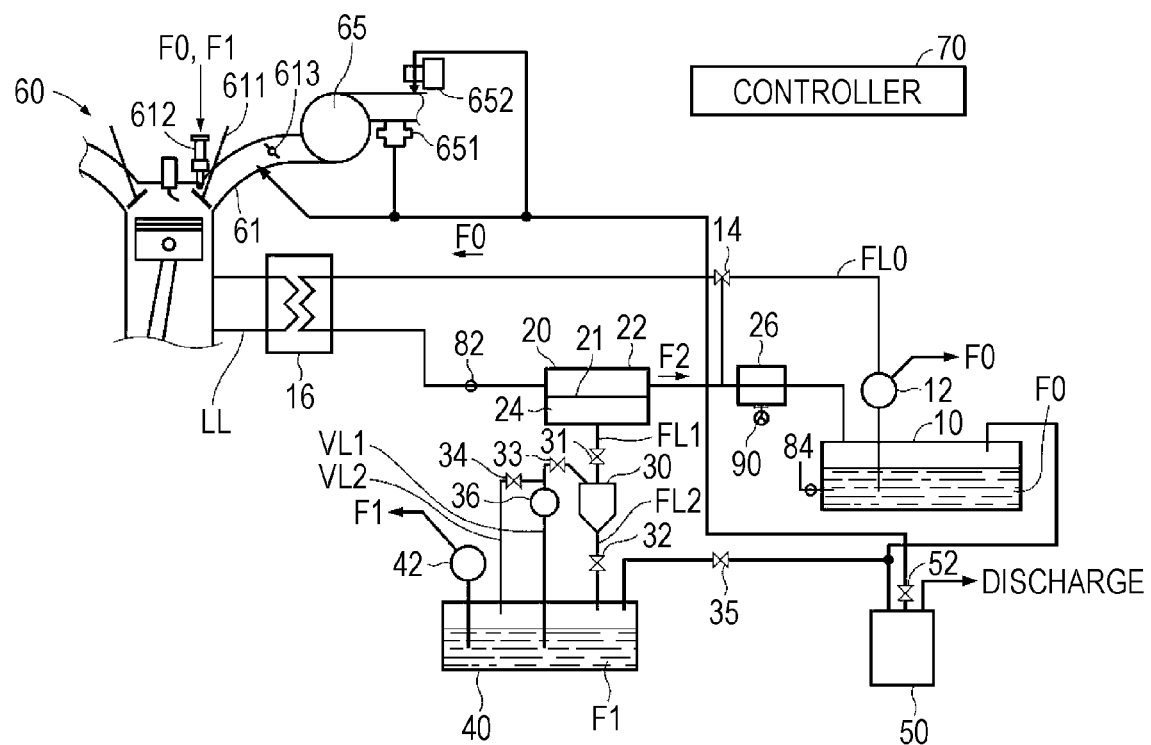
FIG. 1 illustrates the configuration of a fuel supply apparatus according to an embodiment of the present application.

The embodiments will now be described with reference to the accompanying drawings, wherein like reference numerals designate corresponding or identical elements throughout the various drawings.

Configuration

A fuel supply apparatus shown in FIG. 1 includes a raw-fuel tank 10, a separator 20, a condenser 30, a first fuel tank 40, a canister 50, and a controller (or an electronic control unit (ECU)) 70. The fuel supply apparatus is installed in a vehicle and is configured to supply fuel to an internal combustion engine 60 that is also installed in the vehicle.

The raw-fuel tank 10 stores normal or commercially-available gasoline supplied as raw fuel F0 via a filler opening. The raw fuel F0 stored in the raw-fuel tank 10 is pressurized to a specified pressure by a high-pressure supply pump (raw-fuel delivery device) 12 and is subsequently supplied to the internal combustion engine 60.

After being pressurized to the specified pressure by the high-pressure supply pump 12 and heated within a heater 16, the raw fuel F0 is delivered to the separator 20 by traveling along a raw-fuel path FL0. The raw-fuel path FL0 between the heater 16 and the separator 20 is provided with a separator temperature sensor 82. The separator temperature sensor 82 measures the temperature (separator temperature TF1) of the raw fuel flowing into the separator 20 along the raw-fuel path FL0.

The raw-fuel temperature (separator temperature TF1) can be considered to be the same as the temperature of the separator 20 and a separation membrane 21. In order to the measure the temperature with higher accuracy, a temperature sensor, such as a thermocouple, may be provided directly within the separator 20. In that case, the temperature sensor may serve as the separator temperature sensor 82.

In a case where the raw-fuel tank 10 and the heater 16 are cut off from each other by a three-way valve 14, the raw fuel F0 returns to the raw-fuel tank 10 via a cooler (radiator) 26 without traveling through the separator 20.

The fuel supply apparatus further includes a raw-fuel-tank temperature sensor 84 for measuring the temperature of the raw fuel F0 stored in the raw-fuel tank 10.

The heater 16 is formed of a heat exchanger that makes a cooling medium for the internal combustion engine 60 and the raw fuel F0 exchange heat with each other. In place of or in addition to the heat exchanger, the heater 16 may be formed of an electric heater.

By controlling the operation of the high-pressure supply pump 12, an amount of raw fuel F0 (i.e., a first factor) to be supplied to the separator 20 from the raw-fuel path FL0 is adjusted. Additionally or alternatively, for example, the amount of raw fuel F0 to be supplied to the separator 20 may be adjusted, for example, by controlling the degree of opening of the three-way valve 14 or by opening and closing the three-way valve 14.

The fuel supply apparatus further includes a cooling-medium circulation path LL along which the cooling medium (such as water) used for cooling the internal combustion engine 60 circulates. The cooling-medium circulation path LL is provided with a pump (not shown) for circulating the cooling medium along the cooling-medium circulation path LL. The cooling-medium circulation path LL is configured to make the cooling medium exchange heat with the raw fuel F0 flowing along the raw-fuel path FL0 in the heater 16 located downstream of the internal combustion engine 60.

The flow rate of the cooling medium is controlled by controlling the degree of opening of an opening-closing mechanism (such as a flow-rate control valve, not shown) provided in the cooling-medium circulation path LL or by opening and closing the opening-closing mechanism, whereby an amount by which the raw fuel F0 is heated in the heater 16 (i.e., a second factor) is adjusted.

The raw fuel F0 stored in the raw-fuel tank 10 evaporates so that evaporated fuel V containing hydrocarbon and ethanol is produced. The evaporated fuel V is supplied to the canister 50 from the raw-fuel tank 10.

The separator 20 is configured to separate the raw fuel F0 into first fuel F1 and second fuel F2 in accordance with pervaporation (PV). The separator 20 includes the separation membrane 21 that is selectively permeable to a high-octane component in the raw fuel F0, and also includes a high-pressure chamber 22 and a low-pressure chamber 24 that are separated from each other by the separation membrane 21.

The first fuel F1 is high-octane fuel containing a larger amount of high-octane component than the raw fuel F0 and is, for example, alcohol such as ethanol. The second fuel F2 is low-octane fuel containing a smaller amount of high-octane component than the raw fuel F0.

Specifically, the high-pressure chamber 22 in the separator 20 is supplied with high-temperature high-pressure raw fuel F0, and the low-pressure chamber 24 is maintained in a negative-pressure state, whereby the high-octane component contained in the raw fuel F0 penetrates the separation membrane 21 and enters the low-pressure chamber 24. When the amount of high-octane component in the raw fuel F0 increases, the octane number of the penetrating fluid increases correspondingly, so that the first fuel F1 containing a large amount of high-octane component and having a higher octane number than the raw fuel F0 can be collected from the low-pressure side of the separation membrane 21.

On the other hand, since the amount of high-octane component contained in the raw fuel F0 flowing through the high-pressure chamber 22 decreases more and more downstream, the second fuel F2 containing a small amount of high-octane component and having a smaller octane number than the raw fuel F0 remains in the high-pressure chamber 22. The second fuel F2 flowing out from the separator 20 is cooled in the cooler 26 and is subsequently supplied to the raw-fuel tank 10.

Operating conditions of the separator 20, such as the temperature of the separation membrane 21, the temperature and the supply amount of the raw fuel F0, the pressure in the high-pressure chamber 22, and the pressure (negative pressure) in the low-pressure chamber 24, are controlled. Accordingly, for example, the separating rate or the collected amount of the first fuel F1 and the second fuel F2 by the separator 20 changes.

For example, the heater 16 controls the temperature of the raw fuel F0 to be supplied to the separator 20, thereby adjusting the temperature of the separation membrane 21. The temperature of the separation membrane 21 is also adjusted by controlling the flow rate of raw fuel F0 to be supplied to the separator 20. Furthermore, the pressure in the low-pressure chamber 24 that is in communication with the condenser 30 can be adjusted by reducing the pressure in the condenser 30 by actuating a vacuum pump 36.

The separated second fuel F2 travels along a second fuel path and returns to the raw-fuel tank 10 via the cooler 26. The separated second fuel F2 (at a temperature of, for example, about 75° C.) is cooled by the cooler 26 so that the temperature of the raw fuel F0 (at a temperature of, for example, about 50° C.) stored in the raw-fuel tank 10 can be prevented from increasing.

The cooler (radiator) 26 is configured to cool the raw fuel F0 or the second fuel F2 separated by the separator 20 by using an airflow-controllable cooling fan 90. In addition to or in place of the cooling fan 90, the cooler 26 may be formed of a water-cooled cooling device.

By controlling the amount of air supplied by the cooling fan 90, an amount by which the second fuel F2 is cooled in the cooler 26 (i.e., a third factor) is adjusted.

The fuel supply apparatus may further include a cooling device (not shown) for cooling the raw-fuel tank 10. In that case, the cooling amount by the cooling device may be adjusted in place of or in addition to the third factor.

Alternatively, the second fuel F2 may be supplied to a second fuel tank (not shown) that is independent of the raw-fuel tank 10, and may be stored in this second fuel tank. Furthermore, in place of the raw fuel F0, the second fuel F2 stored in the second fuel tank may be supplied to the internal combustion engine 60. In this case, a temperature control process is performed by adjusting the first factor and the second factor without adjusting the third factor.

The condenser (negative-pressure tank) 30 is provided at an intermediate section of a collecting path that connects the low-pressure chamber 24 in the separator 20 to the first fuel tank 40, and is configured to condense the first fuel F1. The condenser 30 is formed of, for example, an air-cooled or water-cooled tank or a reservoir unit.

The condenser 30 is connected to the suction side of the vacuum pump (negative-pressure pump) 36. By actuating the vacuum pump 36, the interior of the condenser 30 is controlled to a negative-pressure state, so that the pressure in the condenser 30 can be set lower than the vapor pressure of the first fuel F1. The evaporated fuel V containing alcohol, such as ethanol, produced as the result of evaporation of the first fuel F1 is supplied to, for example, the first fuel tank 40 by the operation of the vacuum pump 36. The condenser 30 is provided with a pressure sensor (not shown) for measuring the pressure within the condenser 30.

A primary collecting path FL1 that connects the separator 20 and the condenser 30 is provided with a first opening-closing mechanism 31 that opens and closes this path. By opening the first opening-closing mechanism 31, the low-pressure chamber 24 in the separator 20 and the condenser 30 communicate with each other. In contrast, by closing the first opening-closing mechanism 31, the separator 20 and the condenser 30 are cut off from each other.

A secondary collecting path FL2 that connects the condenser 30 and the first fuel tank 40 is provided with a second opening-closing mechanism 32 that opens and closes this path. By opening the second opening-closing mechanism 32, the condenser 30 and the first fuel tank 40 communicate with each other. In contrast, by closing the second opening-closing mechanism 32, the condenser 30 and the first fuel tank 40 are cut off from each other.

The condenser 30 and the first fuel tank 40 are connected to each other by a first evaporated-fuel path VL1 that is independent of the secondary collecting path FL2. The first evaporated-fuel path VL1 is provided with a third opening-closing mechanism 33 and the vacuum pump 36. By opening the third opening-closing mechanism 33 and actuating the vacuum pump 36, the evaporated fuel V is introduced from the condenser 30 into the first fuel F1 stored in the first fuel tank 40.

The first evaporated-fuel path VL1 is connected to the first fuel tank 40 via a second evaporated-fuel path VL2 branching off from the upstream side of the vacuum pump 36. The second evaporated-fuel path VL2 is provided with a fourth opening-closing mechanism 34. By opening the fourth opening-closing mechanism 34 in a state where the third opening-closing mechanism 33 is open, the evaporated fuel V that fills the first fuel tank 40 is introduced into the condenser 30 via the second evaporated-fuel path VL2 and the first evaporated-fuel path VL1.

The first fuel tank 40 stores the first fuel F1 separated from the raw fuel F0 by the separator 20. The first fuel F1 stored in the first fuel tank 40 is pressurized to a specified pressure by a high-pressure supply pump 42 and is subsequently supplied to the internal combustion engine 60.

The first fuel F1 stored in the first fuel tank 40 evaporates so that the evaporated fuel V containing alcohol, such as ethanol, is produced. The first fuel tank 40 and the canister 50 are connected by a connection path that is provided with a fifth opening-closing mechanism 35. By opening the fifth opening-closing mechanism 35, the evaporated fuel V is supplied from the first fuel tank 40 to the canister 50 via the aforementioned connection path.

The first fuel tank 40 is provided with a pressure sensor (not shown) for measuring the internal pressure of the first fuel tank 40. The opening-closing mechanisms 31 to 35 are each formed of, for example, an electromagnetic valve. Because the first evaporated-fuel path VL1 can be opened and closed by actuating and stopping the vacuum pump 36, the third opening-closing mechanism 33 for opening and closing the first evaporated-fuel path VL1 may be omitted.

The canister 50 contains an adsorbent, such as active carbon. The adsorbent adsorbs hydrocarbon in addition to alcohol contained in the evaporated fuel V deriving from the raw fuel F0. Thus, the evaporated fuel V can be separated into alcohol and hydrocarbon, and another component such as nitrogen.

Air containing, for example, the separated nitrogen is discharged from the canister 50 to the outside of the vehicle. On the other hand, when the internal combustion engine 60 starts running and a suction pipe 61 becomes in a negative-pressure state, the alcohol and the hydrocarbon adsorbed by the adsorbent in the canister 50 are supplied to the suction pipe 61 at the downstream side of a throttle valve 613 and are introduced into a combustion chamber where the alcohol and the hydrocarbon are combusted. A discharge path connected to the canister 50 is provided with a flow control valve 52 for controlling the flow rate of the evaporated fuel V in the discharge path.

The canister 50 may be heated by the condensation heat of the first fuel F1 generated in the condenser 30, and the temperature of the canister 50 may be maintained within a temperature range in which the adsorption performance for the evaporated fuel V can be sufficiently exhibited. For example, a flow path of a cooling medium for the condenser 30 may be formed such that the canister 50 is heated by the cooling medium.

A functional element that is not described nor shown, such as a reservoir unit or a heat exchanger, may be provided at an intermediate section of each path.

The suction pipe 61 connected to the combustion chamber in the internal combustion engine 60 is provided with a suction valve 611, a fuel injector 612, and the throttle valve 613. By opening the suction valve 611, the suction pipe 61 and the combustion chamber communicate with each other. In contrast, by closing the suction valve 611, the suction pipe 61 and the combustion chamber are cut off from each other. The throttle valve 613 is configured to control the amount of air to be taken into the internal combustion engine 60.

The fuel injector 612 is disposed between the suction valve 611 and the throttle valve 613 and is configured to selectively inject the raw fuel F0 or the first fuel F1 to each cylinder in the internal combustion engine 60. Alternatively, the fuel injector 612 may be configured to inject both the raw fuel F0 and the first fuel F1 simultaneously with a specified mixture ratio to each cylinder in the internal combustion engine 60. As another alternative, the fuel injector 612 may be configured to inject the raw fuel F0 and the first fuel F1 separately. Mixed gas containing the air taken into the suction pipe 61 and the fuel injected from the fuel injector 612 is introduced into the combustion chamber of each cylinder from the suction pipe 61.

In a case where a second fuel tank is provided, the fuel injector 612 may be configured to selectively inject the first fuel F1 or the second fuel F2 or to simultaneously inject both the first fuel F1 and the second fuel F2 with a specified mixture ratio to each cylinder in the internal combustion engine 60.

The suction pipe 61 is provided with a turbocharger 65, a venturi gas mixer 651, and a purge pump 652 at the upstream side of the throttle valve 613. The evaporated fuel V can be supplied from the canister 50 to the suction pipe 61 via the purge pump 652 and the turbocharger 65.

The internal combustion engine 60 may be a naturally-aspirated engine instead of an engine equipped with the turbocharger 65. In that case, the evaporated fuel V may be supplied from the canister 50 to the suction pipe 61 at the downstream side of the throttle valve 613 via a purge control valve (not shown).

Furthermore, the evaporated fuel V may be supplied directly from the condenser 30 to the suction pipe 61 by the venturi gas mixer 651. Moreover, the evaporated fuel V may be supplied directly from the first fuel tank 40 to the suction pipe 61 of the internal combustion engine 60.

The controller 70 is formed of a programmable computer. The controller 70 receives output signals from various sensors used for detecting various states of the fuel supply apparatus. Examples of the output signals include a signal output from the separator temperature sensor 82 and corresponding to the temperature TF1 of the raw-fuel path FL0, and a signal output from the raw-fuel-tank temperature sensor 84 and corresponding to a temperature TF2 of the raw fuel F0 stored in the raw-fuel tank 10. The controller 70 is programmed to execute a negative-pressure control process, a first temperature control process, and a process for controlling a separator system when the internal combustion engine 60 is stopped.

These processes will be described later. In addition to performing fuel injection control and ignition timing control for the internal combustion engine 60, the controller 70 is programmed to execute arithmetic processing necessary for, for example, controlling the operating conditions of the separator 20, adjusting the amount of fuel to be supplied to the internal combustion engine 60, controlling the operation of each pump, and opening and closing or controlling the degree of opening of each valve.

The expression "is programmed to" means that an arithmetic processing unit, such as a CPU, constituting the computer reads software and additional required information from a memory, such as a read-only memory (ROM) or a random access memory (RAM), or from a storage medium and executes arithmetic processing on the information in accordance with the software.

The controller 70 serves as a "circulation control element" and a "stopping element" according to the present application.

Basic Function

The function of the fuel supply apparatus having the above-described configuration will now be described. Specifically, the controller 70 repeatedly executes a negative-pressure control process in accordance with a procedure to be described below. The following description is based on the assumption that the fifth opening-closing mechanism 35 is closed.

Figure 4:
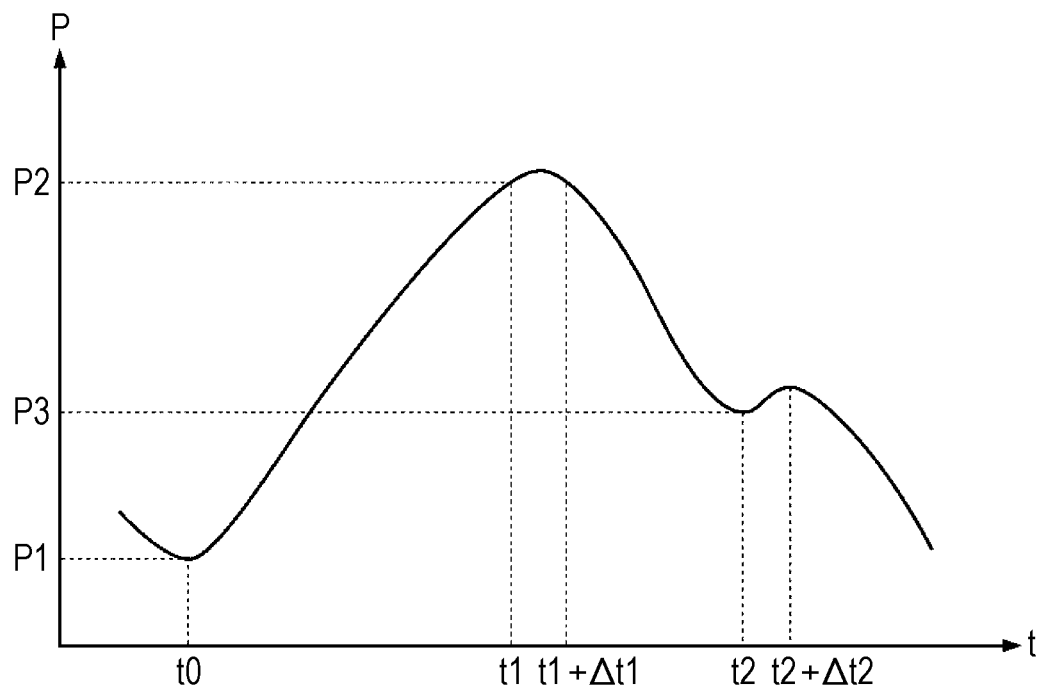
FIG. 4 illustrates a change in internal pressure of a condenser in accordance with negative-pressure control.

When the vacuum pump 36 is actuated in a tertiary state, the condenser 30 is reduced in pressure so that an internal pressure P thereof gradually decreases (see a part before t=t0 in FIG. 4). The term "tertiary state" refers to a state where the primary collecting path FL1, the secondary collecting path FL2, and the second evaporated-fuel path VL2 are closed and the condenser 30 is reduced in pressure by the operation of the vacuum pump 36 (see FIG. 3C). In this case, the first evaporated-fuel path VL1 is opened by the third opening-closing mechanism 33.

Figure 2:
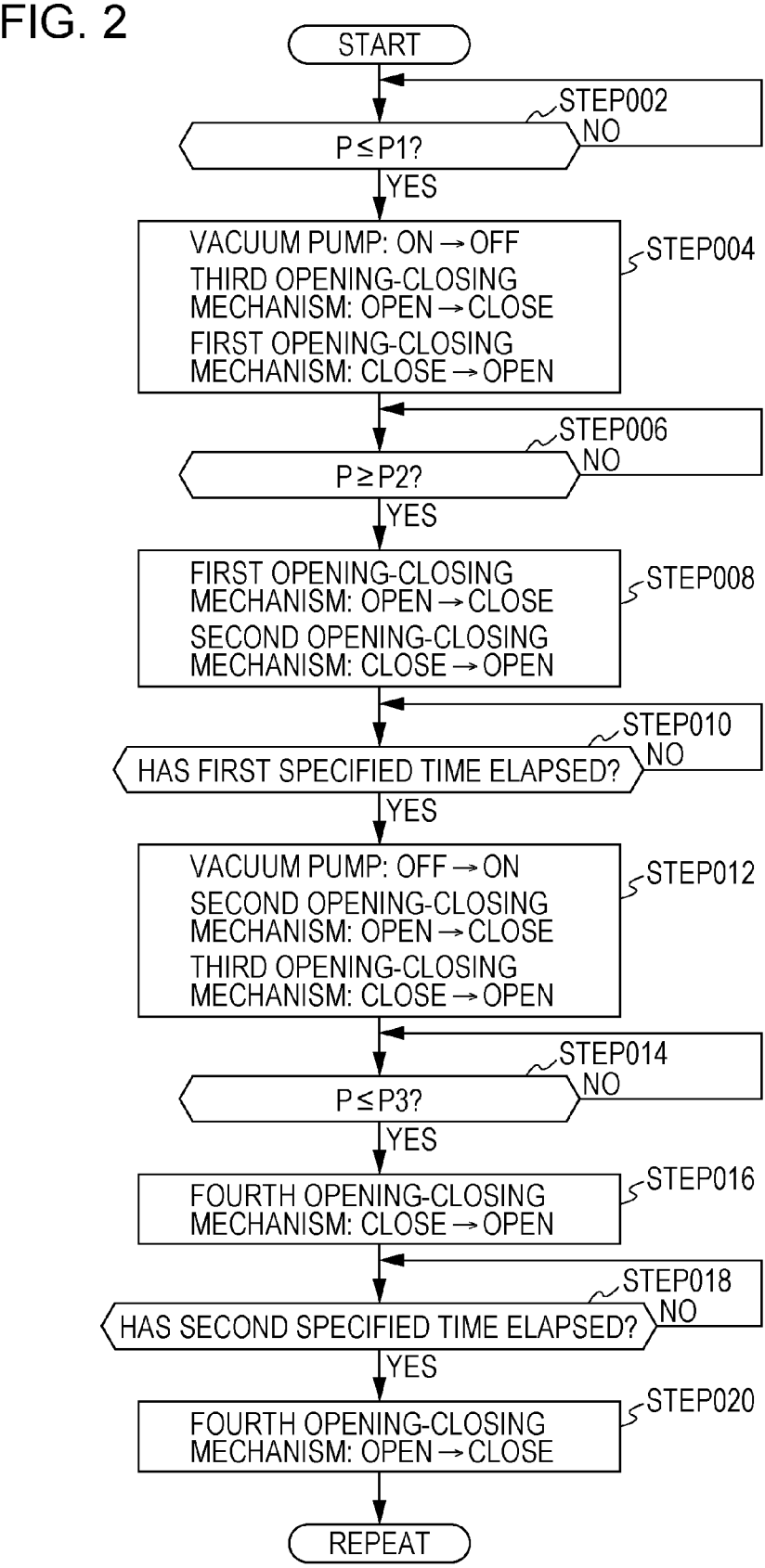
FIG. 2 is a flowchart illustrating a procedure for a negative-pressure control process.

In this state, it is determined whether or not the internal pressure P of the condenser 30 has reached a first negative pressure P1 or lower (STEP 002 in FIG. 2). A negative pressure is defined as a negative value with reference to the atmospheric pressure or normal pressure. In other words, the absolute value of the negative pressure increases as the pressure decreases relative to the atmospheric pressure.

If a positive determination result is obtained (i.e., YES in STEP 002 in FIG. 2 (see t=t0 in FIG. 4)), the first opening-closing mechanism 31 is switched from the closed state to an open state, the third opening-closing mechanism 33 is switched from the open state to a closed state, and the vacuum pump 36 is stopped (STEP 004 in FIG. 2).

Consequently, as shown in FIG. 3A, a primary state in which the primary collecting path FL1 is open, the secondary collecting path FL2 and the second evaporated-fuel path VL2 are closed, and the pressure reduction in the condenser 30 by the operation of the vacuum pump 36 is stopped is obtained.

A condition for changing from the tertiary state to the primary state may be defined not in accordance with the internal pressure P of the condenser 30 but in accordance with a time elapsed from a time point when a transition from a secondary or quaternary state to the tertiary state is achieved. For example, the transition from the tertiary state to the primary state may be achieved when a condition in which the elapsed time becomes longer than or equal to a specified time is satisfied.

In the primary state, the separator 20 begins separating the raw fuel F0 into the first fuel F1 and the second fuel F2, and the first fuel F1 is supplied from the separator 20 to the condenser 30 via the primary collecting path FL1. At least a portion of the first fuel F1 is condensed (i.e., changed from a gas phase to a liquid phase) in the condenser 30, which is in a negative-pressure state and a cooled state, and is stored therein. In the condenser 30, the evaporated fuel V increases, and the internal pressure P of the condenser 30 increases (see a part after t=t0 in FIG. 4).

Subsequently, it is determined whether or not the internal pressure P of the condenser 30 has reached a second negative pressure P2 or higher, which is higher than the first negative pressure P1 (STEP 006 in FIG. 2). Since a negative pressure is defined as a negative value with reference to the atmospheric pressure or normal pressure, as described above, the absolute value of the second negative pressure P2 is smaller than the absolute value of the first negative pressure P1.

If a positive determination result is obtained (i.e., YES in STEP 006 in FIG. 2 (see t=t1 in FIG. 4)), the first opening-closing mechanism 31 is switched from the open state to a closed state, whereas the second opening-closing mechanism 32 is switched from the closed state to an open state (STEP 008 in FIG. 2). Consequently, as shown in FIG. 3B, a secondary state in which the primary collecting path FL1 and the second evaporated-fuel path VL2 are closed, the secondary collecting path FL2 is open, and the pressure reduction in the condenser 30 by the operation of the vacuum pump 36 is stopped is obtained.

A condition for changing from the primary state to the secondary state may be defined not in accordance with the internal pressure P of the condenser 30 but in accordance with a time elapsed from a time point when a transition from the tertiary state to the primary state is achieved. For example, the transition from the primary state to the secondary state may be achieved when a condition in which the elapsed time becomes longer than or equal to a specified time is satisfied.

The value of the first negative pressure P1 and the value of the second negative pressure P2 may be changed in advance to various values, and may be changed by the controller 70 in accordance with the driving mode (such as an acceleration request) of the fuel supply apparatus or the vehicle equipped with the apparatus. For example, the concentration or the amount of first fuel F1 contained in the raw fuel F0 stored in the raw-fuel tank 10 may be measured, and the second negative pressure P2 may be set to a higher value as the measured value becomes higher.

Because the primary collecting path FL1 is closed by the first opening-closing mechanism 31, the low-pressure chamber 24 in the separator 20 and the condenser 30 are cut off from each other, so that the separator 20 stops separating the raw fuel F0 into the first fuel F1 and the second fuel F2. Because the secondary collecting path FL2 is opened by the second opening-closing mechanism 32, the liquid-phase first fuel F1 stored in the condenser 30 is supplied to the first fuel tank 40 via the secondary collecting path FL2 (see a downward arrow in FIG. 3B).

After the secondary state is obtained, it is determined whether or not a first specified time Δt1 (e.g. 10 seconds) has elapsed (STEP 010 in FIG. 2).

If a positive determination result is obtained (i.e., YES in STEP 010 in FIG. 2 (see t=t1+Δt1 in FIG. 4)), the second opening-closing mechanism 32 is switched from the open state to a closed state, the third opening-closing mechanism 33 is switched from the closed state to an open state, and the operation of the vacuum pump 36 commences (STEP 012 in FIG. 2). Consequently, the tertiary state shown in FIG. 3C is obtained.

In the tertiary state, the evaporated fuel V (gas) is supplied from the condenser 30 to the first fuel tank 40 via the first evaporated-fuel path VL1 (see a downward arrow in FIG. 3C). The evaporated fuel V induces bubbling in the first fuel F1 in the first fuel tank 40, such that at least a portion of the evaporated fuel V forming bubbles can be taken into the liquid-phase first fuel F1. In the first fuel tank 40, the first fuel F1 is in a two-phase state (i.e., gas-liquid phase), and the first fuel tank 40 is increased in pressure as the result of being supplied with the evaporated fuel V from the condenser 30.

The evaporated fuel V may be supplied from the condenser 30 to a space similarly filled with evaporated fuel V in the first fuel tank 40.

The operation of the vacuum pump 36 causes the internal pressure P of the condenser 30 to decrease (see a part after t=t1+Δt1 in FIG. 4). At this point, it is determined whether or not the internal pressure P of the condenser 30 has reached a third negative pressure P3 or lower, which is higher than the first negative pressure P1 but lower than the second negative pressure P2 (STEP 014 in FIG. 2).

If a positive determination result is obtained (i.e., YES in STEP 014 in FIG. 2 (see t=t2 in FIG. 4)), the fourth opening-closing mechanism 34 is switched from the closed state to an open state (STEP 016 in FIG. 2). Consequently, as shown in FIG. 3D, a quaternary state in which the primary collecting path FL1 and the secondary collecting path FL2 are closed, the second evaporated-fuel path VL2 is open, and the condenser 30 is reduced in pressure due to the operation of the vacuum pump 36 is obtained.

The transition from the tertiary state to the quaternary state may alternatively be achieved when a condition in which a decreasing rate |dP/dt| of the internal pressure P becomes a predetermined rate or lower is satisfied instead of when the internal pressure P of the condenser 30 reaches the third negative pressure P3 or lower, which is higher than the first negative pressure P1 but lower than the second negative pressure P2.

In the quaternary state, because the evaporated fuel V is supplied from the first fuel tank 40 to the condenser 30 via the second evaporated-fuel path VL2 (see an upward arrow in FIG. 3D), the internal pressure P of the condenser 30 increases (see a part after t=t2 in FIG. 4).

After the quaternary state is obtained, it is determined whether or not a second specified time Δt2 (e.g. 10 seconds), which may be the same as or different from the first specified time Δt1, has elapsed (STEP 018 in FIG. 2).

If a positive determination result is obtained (i.e., YES in STEP 018 in FIG. 2 (see t=t2+Δt2 in FIG. 4)), the fourth opening-closing mechanism 34 is switched from the open state to a closed state (STEP 020 in FIG. 2). Consequently, the tertiary state is obtained again so that the internal pressure P of the condenser 30 changes from the increasing state to a decreasing state (see a part after t=t2+Δt2 in FIG. 4).

Subsequently, the series of above-described steps is repeated (see STEP 002 to STEP 020 in FIG. 2).

Furthermore, when the negative-pressure control process is being executed by the controller 70, it is determined whether or not an opening condition for the first fuel tank 40 is satisfied. In this case, the "opening condition" may be a condition in which the measured pressure in the first fuel tank 40 becomes higher than or equal to a threshold value, a condition in which a vehicle acceleration request that exceeds a threshold value is received, or a combination of these conditions.

If it is determined that the opening condition is satisfied, the fifth opening-closing mechanism 35 is switched from a closed state to an open state, whereby a quintic state in which the path that connects the first fuel tank 40 and the canister 50 is open is obtained. In this case, for example, the first opening-closing mechanism 31, the second opening-closing mechanism 32, the third opening-closing mechanism 33, and the fourth opening-closing mechanism 34 are controlled so that they are closed. In the quintic state, the evaporated fuel V is released from the first fuel tank 40 and is adsorbed by the canister 50, and is supplied to the internal combustion engine 60 via the suction pipe 61, where necessary. Alternatively, the evaporated fuel V may be directly supplied to the internal combustion engine 60. Consequently, the utilization efficiency of the evaporated fuel V is improved.

With the negative-pressure control process, the first fuel F1 separated by the separator 20 is supplied in a gas state (i.e., in the form of evaporated fuel) from the separator 20 to the condenser 30 via the primary collecting path FL1, and at least a portion of the first fuel F1 is condensed in the condenser 30 so as to be stored therein in a liquid state.

Subsequently, in the secondary state (primary collecting path FL1: closed, second evaporated-fuel path VL2: closed, secondary collecting path FL2: open, condenser 30: no pressure reduction), the liquid-phase first fuel F1 is supplied from the condenser 30 to the first fuel tank 40 via the secondary collecting path FL2 (STEP 008 in STEP 2, see FIG. 3B).

Furthermore, in the tertiary state (primary collecting path FL1: closed, secondary collecting path FL2: closed, second evaporated-fuel path VL2: closed, condenser 30: pressure reduction), the vacuum pump 36 is actuated. Consequently, the evaporated fuel V is supplied from the condenser 30 to the first fuel tank 40 via the first evaporated-fuel path VL1 (STEP 012 in FIG. 2, see FIG. 3C).

In this case, the internal pressure P of the condenser 30 decreases (see t=(t1+Δt1) to t2 in FIG. 4). At least a portion of the evaporated fuel V changes from a gas phase to a liquid phase and can be stored in the first fuel tank 40 as the first fuel F1. Accordingly, when the pressure of the condenser 30 is reduced, the evaporated fuel V is prevented from being discharged outside the vehicle in the form of a non-collectible, non-usable state, whereby the utilization efficiency of the evaporated fuel V is improved.

Alternatively, the evaporated fuel V may be discharged outside the vehicle without executing the negative-pressure control process described above.

Additional Function (First Temperature Control Process (First Embodiment))

In a first temperature control process, the amount of raw fuel to be supplied (i.e., the first factor), the flow rate of cooling medium (i.e., the second factor), and the amount of air supplied by the cooling fan 90 (i.e., the third factor) are adjusted so that the separator temperature TF1 is set to within a predetermined first temperature range (e.g. 75° C.±1° C.) and the raw-fuel-tank temperature TF2 is set to within a predetermined second temperature range (e.g. 50° C. or lower).

A lower limit value of the first temperature range can be determined in view of allowing the separator 20 to sufficiently exhibit its separating performance. Furthermore, if the processing capability and the capacity of the condenser 30 are limited for saving installation space, an upper limit value of the first temperature range can be determined such that wasteful separation that exceeds a limit value of the processing capability of the condenser 30 is suppressed. Moreover, the upper limit value of the first temperature range can be determined in view of, for example, preventing the raw fuel F0 from boiling.

The first temperature range may be set dynamically in the following manner. For example, in order to facilitate the separation of the first fuel F1 in a case where the amount of stored first fuel F1 is small, if the amount of stored first fuel F1 is smaller than or equal to a predetermined reference value, a temperature range that is higher than that in a case where the amount of stored first fuel F1 exceeds the predetermined reference value may be set as the first temperature range. In a case where the amount of stored first fuel F1 is large due to the installation space, the separation of the first fuel F1 is to be suppressed. Therefore, if the amount of stored first fuel F1 exceeds the predetermined reference value, a temperature range that is lower than that in a case where the amount of stored first fuel F1 is smaller than or equal to the predetermined reference value is set as the first temperature range.

An upper limit value of the second temperature range can be determined in view of preventing defective circulation of the raw fuel F0 or alteration or evaporation of the raw fuel F0. A lower limit value of the second temperature range can be determined in view of supplying the raw fuel F0 to the separator 20 and the internal combustion engine 60. If it is substantially conceivable that the temperature of the raw fuel F0 would not fall below the lower limit value, it is not necessary to provide a lower limit value.

Figure 6:
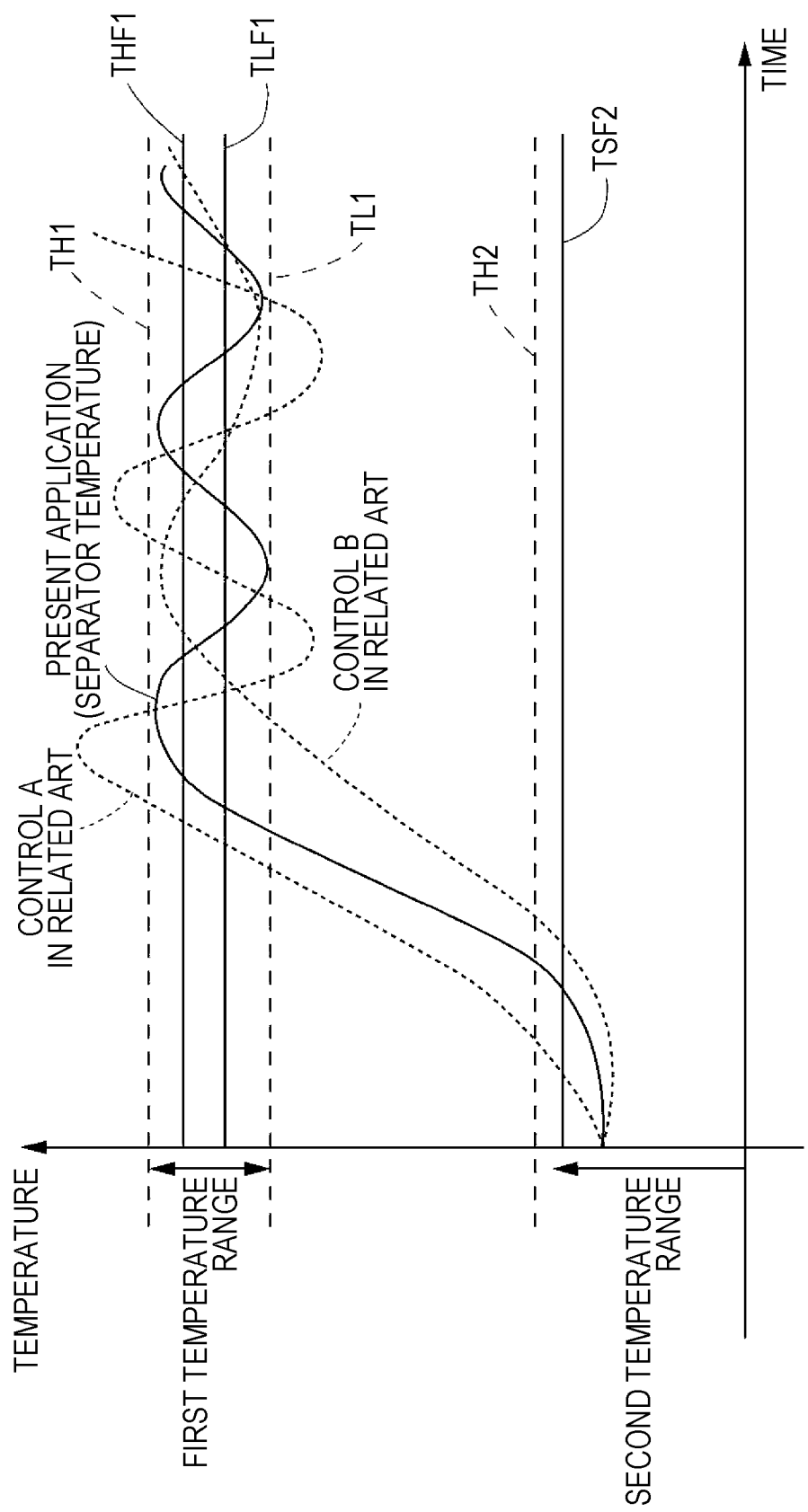
FIG. 6 is a graph that compares the present application with techniques in the related art with respect to operating speed and controllability.

As shown in FIG. 6, a first high reference temperature THF1 is set as a predetermined temperature that is lower than an upper-limit temperature TH1 of the first temperature range but higher than a lower-limit temperature TL1 of the first temperature range. A first low reference temperature TLF1 is set as a predetermined temperature that is higher than the lower-limit temperature TL1 of the first temperature range but lower than or equal to the first high reference temperature THF1. A second reference temperature TSF2 is set as a predetermined temperature that is lower than an upper-limit temperature TH2 of the second temperature range.

The first temperature control process executed by the controller 70 will now be described with reference to FIG. 5. The controller 70 continuously repeats the first temperature control process to be described below.

Figure 5:
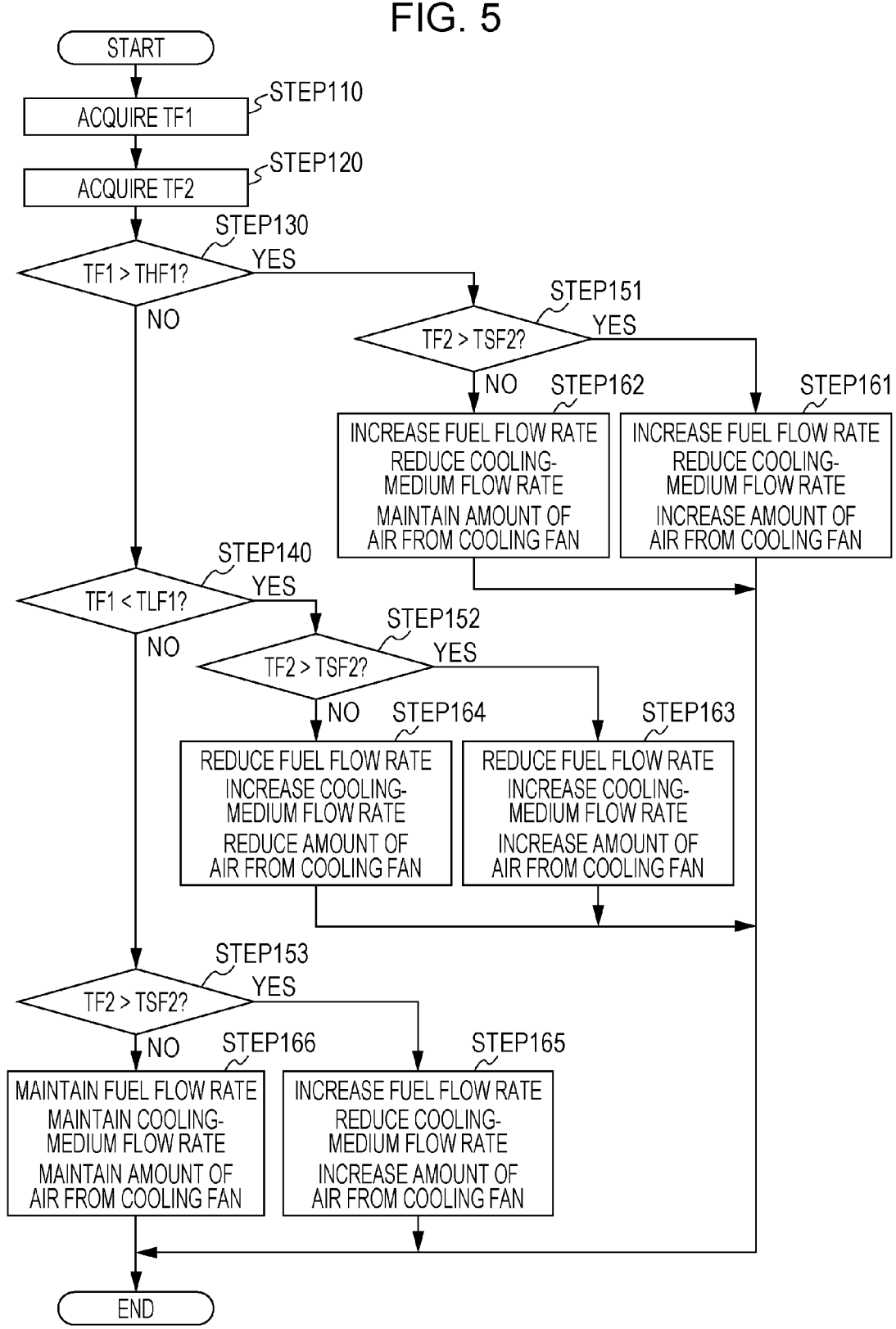
FIG. 5 is a flowchart of a first temperature control process.

First, a separator temperature TF1 is acquired from the separator temperature sensor 82 (STEP 110 in FIG. 5). Then, a raw-fuel-tank temperature TF2 is acquired from the raw-fuel-tank temperature sensor 84 (STEP 120 in FIG. 5).

Subsequently, it is determined whether or not the separator temperature TF1 is higher than the first high reference temperature THF1 (STEP 130 in FIG. 5).

If a positive determination result is obtained (i.e., YES in STEP 130 in FIG. 5), it is determined whether or not the raw-fuel-tank temperature TF2 is higher than the second reference temperature TSF2 (STEP 151 in FIG. 5).

Then, if a positive determination result is obtained in STEP 151 (i.e., YES in STEP 151 in FIG. 5 when the raw-fuel-tank temperature TF2 is higher than the second reference temperature TSF2), the flow rate of raw fuel F0 (i.e., the first factor) is increased, the flow rate of cooling medium (i.e., the second factor) is reduced, and the amount of air supplied by the cooling fan 90 (i.e., the third factor) is increased (STEP 161 in FIG. 5).

On the other hand, if a negative determination result is obtained in STEP 151 (i.e., NO in STEP 151 in FIG. 5 when the raw-fuel-tank temperature TF2 is lower than or equal to the second reference temperature TSF2), the flow rate of raw fuel F0 (i.e., the first factor) is increased, the flow rate of cooling medium (i.e., the second factor) is reduced, and the amount of air supplied by the cooling fan 90 (i.e., the third factor) is maintained (STEP 162 in FIG. 5). In this case, the amount of air supplied by the cooling fan 90 may be increased so as to suppress an increase in the raw-fuel-tank temperature TF2.

If a negative determination result is obtained in STEP 130 (i.e., NO in STEP 130 in FIG. 5), it is determined whether or not the separator temperature TF1 is lower than the first low reference temperature TLF1 (STEP 140 in FIG. 5).

If a positive determination result is obtained in STEP 140 (i.e., YES in STEP 140 in FIG. 5 when the separator temperature TF1 is lower than the first low reference temperature TLF1), it is determined whether or not the raw-fuel-tank temperature TF2 is higher than the second reference temperature TSF2 (STEP 152 in FIG. 5).

Then, if a positive determination result is obtained in STEP 152 (i.e., YES in STEP 152 in FIG. 5 when the raw-fuel-tank temperature TF2 is higher than the second reference temperature TSF2), the flow rate of raw fuel F0 (i.e., the first factor) is reduced, the flow rate of cooling medium (i.e., the second factor) is increased, and the amount of air supplied by the cooling fan 90 (i.e., the third factor) is increased (STEP 163 in FIG. 5).

On the other hand, if a negative determination result is obtained in STEP 152 (i.e., NO in STEP 152 in FIG. 5 when the raw-fuel-tank temperature TF2 is lower than or equal to the second reference temperature TSF2), the flow rate of raw fuel F0 (i.e., the first factor) is reduced, the flow rate of cooling medium (i.e., the second factor) is increased, and the amount of air supplied by the cooling fan 90 (i.e., the third factor) is reduced (STEP 164 in FIG. 5).

If a negative determination result is obtained in STEP 140 (i.e., NO in STEP 140 in FIG. 5 when the separator temperature TF1 is higher than or equal to the first low reference temperature TLF1), it is determined whether or not the raw-fuel-tank temperature TF2 is higher than the second reference temperature TSF2 (STEP 153 in FIG. 5).

Then, if a positive determination result is obtained in STEP 153 (i.e., YES in STEP 153 in FIG. 5 when the raw-fuel-tank temperature TF2 is higher than the second reference temperature TSF2), the flow rate of raw fuel F0 (i.e., the first factor) is increased, the flow rate of cooling medium (i.e., the second factor) is reduced, and the amount of air supplied by the cooling fan 90 (i.e., the third factor) is increased (STEP 165 in FIG. 5).

On the other hand, if a negative determination result is obtained in STEP 153 (i.e., NO in STEP 153 in FIG. 5 when the raw-fuel-tank temperature TF2 is lower than or equal to the second reference temperature TSF2), the flow rate of raw fuel F0 (i.e., the first factor), the flow rate of cooling medium (i.e., the second factor), and the amount of air supplied by the cooling fan 90 (i.e., the third factor) are not to be changed (STEP 166 in FIG. 5).

The series of STEP 161 to STEP 166 from STEP 110 constitute one cycle of the first temperature control process. When STEP 161 to STEP 166 are completed, the controller 70 executes a subsequent cycle.

Additional Function: Process for Controlling Separator System When Internal Combustion Engine is Stopped Next, a process for controlling a separator system when the internal combustion engine 60 is stopped will be described. This control is performed on the internal combustion engine 60 and the fuel supply apparatus by the controller 70 when the controller 70 receives a signal for stopping the internal combustion engine 60.

Figure 8:
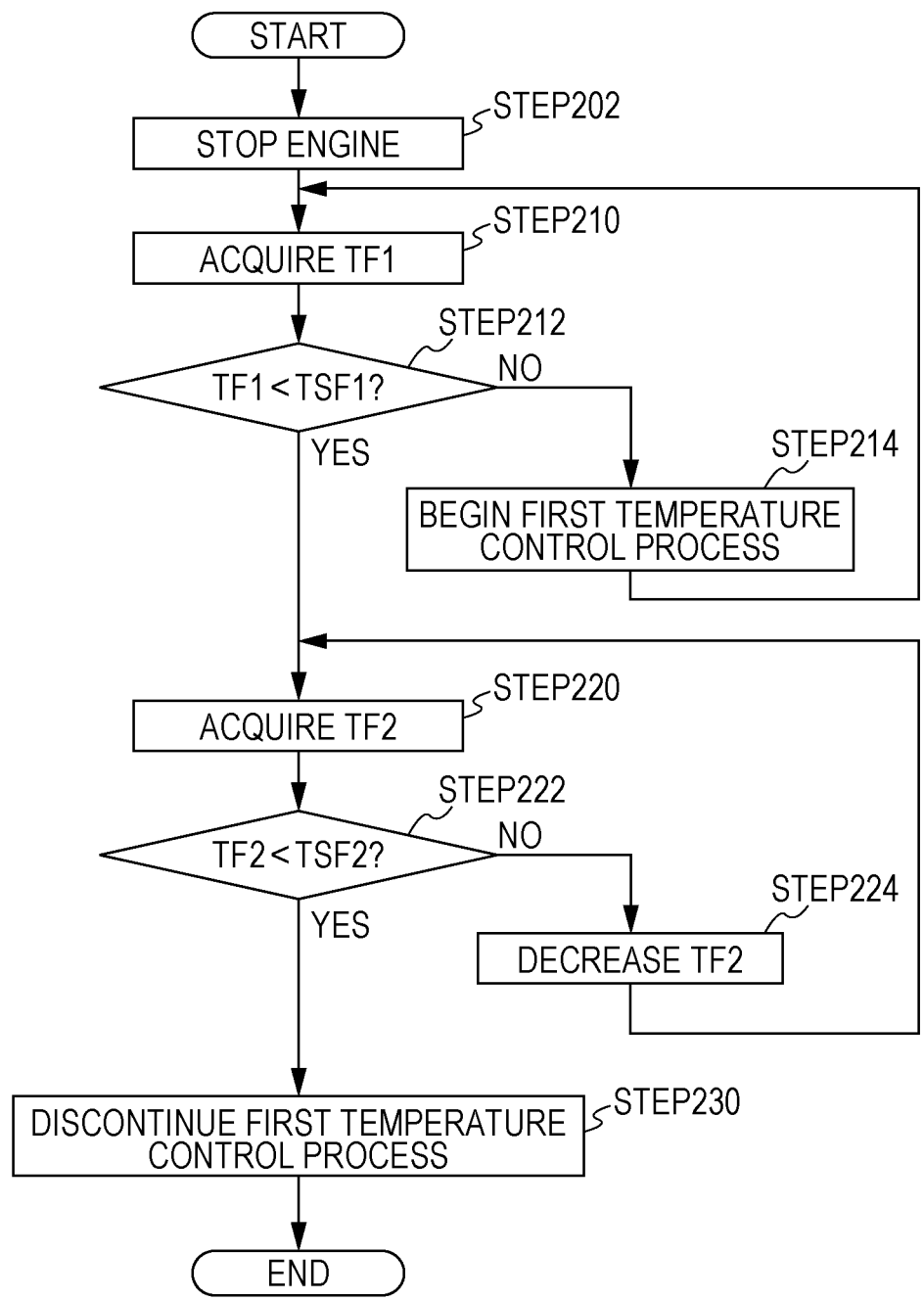
FIG. 8 is a flowchart of a process for controlling a separator system when an internal combustion engine is stopped.

When the controller 70 receives a signal for stopping the internal combustion engine 60, the controller 70 first stops the internal combustion engine 60 (STEP 202 in FIG. 8).

Then, the controller 70 acquires the separator temperature TF1 (i.e., a first temperature) (STEP 210 in FIG. 8). Subsequently, the controller 70 determines whether or not the separator temperature TF1 (i.e., the first temperature) is below a first reference temperature TSF1 (e.g. a temperature that is the same as the first low reference temperature TLF1) for sufficiently exhibiting the separating performance (STEP 212 in FIG. 8). If the separator temperature TF1 (i.e., the first temperature) is higher than or equal to the first reference temperature TSF1 (i.e., NO in STEP 212 in FIG. 8), the controller 70 begins the first temperature control process (STEP 214 in FIG. 8), and then returns to STEP 210.

If the separator temperature TF1 (i.e., the first temperature) is below the first reference temperature TSF1 (YES in STEP 212 in FIG. 8), the controller 70 acquires the raw-fuel-tank temperature TF2 (i.e., a second temperature) (STEP 220 in FIG. 8).

Subsequently, the controller 70 determines whether or not the raw-fuel-tank temperature TF2 (i.e., the second temperature) is below the second reference temperature TSF2, which is suitable for preventing alteration and evaporation of the raw fuel F0 (STEP 222 in FIG. 8). If the raw-fuel-tank temperature TF2 (i.e., the second temperature) is higher than or equal to the second reference temperature TSF2 (i.e., NO in STEP 222 in FIG. 8), the controller 70 increases the flow rate of raw fuel F0 (i.e., the first factor) and the amount of air supplied by the cooling fan 90 (i.e., the third factor) in view of quickly decreasing the raw-fuel-tank temperature TF2 (i.e., the second temperature) (STEP 224 in FIG. 8). After STEP 224 in FIG. 8, the process returns to STEP 220 in FIG. 8.

If the raw-fuel-tank temperature TF2 (i.e., the second temperature) is below the second reference temperature TSF2 (i.e., YES in STEP 222 in FIG. 8), the controller 70 stops the high-pressure supply pump 12 so as to discontinue the first temperature control process (STEP 230 in FIG. 8).

In STEP 212 in FIG. 8, it may be determined whether or not the temperature of the cooling medium is below a cooling-water reference temperature, which is a temperature for sufficiently heating the fuel, instead of determining whether or not the separator temperature TF1 is below the first reference temperature TSF1.

Furthermore, in STEP 220 in FIG. 8, the first temperature control process may be discontinued without performing the temperature determination related to the second temperature.

Furthermore, in STEP 224 in FIG. 8, at least one of the flow rate of raw fuel F0, the heating amount by the heater 16, and the amount of air supplied by the cooling fan 90 may be adjusted in view of not affecting the fuel consumption so that most efficient cooling with respect to the power consumption can be performed.

Advantages of First Temperature Control Process
(First Embodiment)

With the first temperature control process according to the this embodiment, the flow rate of raw fuel F0 (i.e., the first factor), the flow rate of cooling medium (i.e., the second factor), and the amount of air supplied by the cooling fan 90 (i.e., the third factor) are adjusted in accordance with the separator temperature TF1 and the raw-fuel-tank temperature TF2.

In this embodiment, if the first temperature is higher than the first high reference temperature THF1, control is performed so that the first temperature is decreased. If the first temperature is lower than the first low reference temperature TLF1, control is performed so that the first temperature is increased. If the second temperature is higher than the second reference temperature TSF2, control is performed so that the second temperature becomes lower. If the second temperature is lower than the second reference temperature TSF2, particular control is not performed since the second temperature may be maintained at that temperature or may increase or decrease.

If the separator temperature TF1 is higher than the first high reference temperature THF1 and the raw-fuel-tank temperature TF2 is higher than the second reference temperature TSF2, the flow rate of raw fuel F0 (i.e., the first factor) is increased and the flow rate of cooling medium (i.e., the second factor) is reduced (STEP 161 in FIG. 5) so that the temperature of the raw fuel F0 flowing into the separator 20 becomes lower than that before the first temperature control process in the present cycle, resulting in a decrease in the temperature of the separation membrane 21. On the other hand, since the amount of air supplied by the cooling fan 90 (i.e., the third factor) is increased (STEP 161 in FIG. 5), the temperature of the second fuel F2 flowing into the raw-fuel tank 10 becomes lower than that before the first temperature control process in the present cycle, causing the temperature of the raw-fuel tank 10 to decrease.

If the separator temperature TF1 is higher than the first high reference temperature THF1 and the raw-fuel-tank temperature TF2 is lower than or equal to the second reference temperature TSF2, the flow rate of raw fuel F0 (i.e., the first factor) is increased and the flow rate of cooling medium (i.e., the second factor) is reduced (STEP 162 in FIG. 5), so that the amount by which the raw fuel F0 is heated per unit flow rate in the heater 16 decreases. The temperature of the raw fuel F0 flowing into the separator 20 becomes lower than the temperature thereof before the first temperature control process in the present cycle, resulting in a decrease in the temperature of the separation membrane 21.

If the separator temperature TF1 is lower than the first low reference temperature TLF1 and the raw-fuel-tank temperature TF2 is higher than the second reference temperature TSF2, the flow rate of raw fuel F0 (i.e., the first factor) is reduced and the flow rate of cooling medium (i.e., the second factor) is increased (STEP 163 in FIG. 5), so that the amount by which the raw fuel F0 is heated per unit flow rate increases, and the temperature of the raw fuel F0 flowing into the separator 20 becomes higher than the temperature thereof before the first temperature control process in the present cycle. Thus, the separation membrane 21 is increased in temperature. On the other hand, since the flow rate of raw fuel F0 (i.e., the first factor) is reduced and the amount of air supplied by the cooling fan 90 (i.e., the third factor) is increased (STEP 163 in FIG. 5), the amount by which the separated second fuel F2 is cooled per unit flow rate increases, causing the temperature of the second fuel F2 flowing into the raw-fuel tank 10 to become lower than the temperature thereof before the first temperature control process in the present cycle. Thus, the raw-fuel tank 10 decreases in temperature.

If the separator temperature TF1 is lower than the first low reference temperature TLF1 and the raw-fuel-tank temperature TF2 is lower than or equal to the second reference temperature TSF2, the flow rate of raw fuel F0 (i.e., the first factor) is reduced and the flow rate of cooling medium (i.e., the second factor) is increased (STEP 164 in FIG. 5), so that the amount by which the raw fuel F0 is heated per unit flow rate increases. As a result, the temperature of the separation membrane 21 can be increased. On the other hand, since the amount of air supplied by the cooling fan 90 (i.e., the third factor) is reduced (STEP 164 in FIG. 5), the amount by which the separated second fuel F2 is cooled per unit flow rate decreases. As a result, the temperature of the second fuel F2 flowing into the raw-fuel tank 10 becomes higher than the temperature thereof before the first temperature control process in the present cycle, thus causing the first temperature to increase.

If the separator temperature TF1 is lower than or equal to the first high reference temperature THF1 and higher than or equal to the first low reference temperature TLF1 and the raw-fuel-tank temperature TF2 is higher than the second reference temperature TSF2, the flow rate of raw fuel F0 (i.e., the first factor) is increased and the flow rate of cooling medium (i.e., the second factor) is reduced (STEP 165 in FIG. 5), so that the amount by which the raw fuel F0 is heated per unit flow rate in the heater 16 is reduced. Because the temperature of the raw fuel F0 before it is heated is higher than the second reference temperature TSF2, the temperature of the raw fuel F0 after it is heated becomes close to an appropriate temperature. Accordingly, the separation membrane 21 is maintained at an appropriate temperature. Furthermore, since the amount of air supplied by the cooling fan 90 (i.e., the third factor) is increased (STEP 165 in FIG. 5), the second fuel F2 separated by the separator 20 is cooled by the cooling fan 90 to a temperature lower than that before the first temperature control process in the present cycle, so that the temperature of the second fuel F2 flowing into the raw-fuel tank 10 decreases. Consequently, the temperature of the raw-fuel tank 10 can be decreased to a temperature lower than that before the first temperature control process in the present cycle.

If the separator temperature TF1 is lower than or equal to the first high reference temperature THF1 and higher than or equal to the first low reference temperature TLF1 and the raw-fuel-tank temperature TF2 is lower than or equal to the second reference temperature TSF2, the flow rate of raw fuel F0 (i.e., the first factor), the flow rate of cooling medium (i.e., the second factor), and the amount of air supplied by the cooling fan 90 (i.e., the third factor) are not to be changed (STEP 166 in FIG. 5). Thus, the raw fuel F0 and the second fuel F2 do not change in temperature, so that the separator temperature TF1 and the raw-fuel-tank temperature TF2 do not change.

Accordingly, when the separator temperature TF1 is higher than the first low reference temperature TLF1, control is performed so that the separator temperature TF1 becomes lower. On the other hand, when the separator temperature TF1 is lower than the first low reference temperature TLF1, control is performed so that the separator temperature TF1 becomes higher. Furthermore, when the raw-fuel-tank temperature TF2 is higher than the second reference temperature TSF2, control is performed so that the raw-fuel-tank temperature TF2 becomes lower. By repeating these control processes, the temperatures can be quickly set to within the predetermined temperature ranges.

As shown in FIG. 6, the present application achieves higher operating speed (faster temperature increase) than that in control B in the related art, and better controllability than that in control A in the related art. Furthermore, as shown in FIG. 7, the present application achieves better balance between operating speed and controllability, as compared with control A and control B in the related art.

Advantages of Process for Controlling Separator System When Internal Combustion Engine is Stopped With the process according to the present application for controlling the separator system when the internal combustion engine 60 is stopped, if the separator temperature TF1 is higher than or equal to the temperature (i.e., the first reference temperature TSF1) for allowing the separator temperature TF1 to sufficiently exhibit its separating performance, the raw fuel F0 is delivered to the raw-fuel path FL0 by the high-pressure supply pump 12 without immediately stopping the internal combustion engine 60 so that the separating process is continuously performed. When the separator temperature TF1 is below the first reference temperature TSF1, the raw-fuel-tank temperature TF2 is measured.

If the raw-fuel-tank temperature TF2 is high, the flow rate of raw fuel F0 (i.e., the first factor) and the amount of air supplied by the cooling fan 90 (i.e., the third factor) are controlled for quickly decreasing the raw-fuel-tank temperature TF2.

If the raw-fuel-tank temperature TF2 is not high, the high-pressure supply pump 12 is stopped. Thus, when stopping the internal combustion engine 60, the high-pressure supply pump 12 is controlled on the basis of the temperature of the separator 20 so that the fuel separation can be performed without wasting afterheat produced during the operation of the internal combustion engine 60.

Other Embodiments of Present Application

In the first temperature control process, two reference temperatures, that is, the first high reference temperature THF1 and the first low reference temperature TLF1, are used with respect to the separator temperature TF1 (i.e., the first temperature). Alternatively, these reference temperatures may be set to the same temperature as the first reference temperature TSF1, as in a second temperature control process to be described later. In this case, the first temperature may be set to a predetermined target temperature instead of being set to within the first temperature range.

Furthermore, even when the second temperature falls below the second reference temperature, the first to third factors may be adjusted so that the second temperature is set to a predetermined target temperature (e.g. the second reference temperature TSF2) instead of being set to within the second temperature range.

Although the first temperature control process is performed on the basis of the separator temperature TF1 (i.e., the first temperature) and the raw-fuel-tank temperature TF2 (i.e., the second temperature), the process may be performed on the basis of the separator temperature TF1 (i.e., the first temperature) alone, as in the second temperature control process to be described later.

indicate that the corresponding temperature is to be increased, maintained, decreased, and does not require particular control.

The symbols "↑", "→", and "↓" in the columns below the first to third factors respectively indicate that the corresponding factor is to be increased, maintained, and reduced.

The symbol ">" in the priority column indicates that the factor corresponding to the Roman numeral written to the left of the symbol (e.g. the second factor if the symbol is "II") is preferably adjusted with higher priority over the factor written to the right of the symbol. More specifically, if adjustment is to be performed with one or two factors, the factor written to the left of the symbol ">" is preferably adjusted rather than adjusting the factor written to the right of the symbol ">".

Although the rows other than the row corresponding to No. 2 in Table 1 only require adjustment of at least one factor, the row corresponding to No. 2 in Table 1 requires adjustment of at least two factors.

As shown in Table 1, although the flow rate of raw fuel F0 (i.e., the first factor), the flow rate of cooling medium (i.e., the second factor), and the amount of air supplied by the cooling fan 90 (i.e., the third factor) are all adjusted in the first temperature control process, at least one of the flow rate of raw fuel F0 (i.e., the first factor), the flow rate of cooling medium (i.e., the second factor), and the amount of air supplied by the cooling fan 90 (i.e., the third factor) may be adjusted.

For example, when the separator temperature TF1 (i.e., the first temperature) is to be increased and the raw-fuel-tank temperature TF2 (i.e., the second temperature) does not need to be decreased (STEP 164 in FIG. 5), at least one of reduction of the flow rate of raw fuel F0 (i.e., the first factor), increase of the flow rate of cooling medium (i.e., the second factor), and reduction of the amount of air supplied by the cooling fan 90 (i.e., the third factor) is performed (see the row corresponding to No. 1 in Table 1).

When adjusting the aforementioned factors, it is preferable that at least two of the factors be adjusted. By adjusting at least two of the factors, the separator temperature TF1 (i.e., the first temperature) and the raw-fuel-tank temperature TF2 can be controlled more readily as compared with a case where one factor is adjusted.

TABLE 1

| No. | STEP in FIG. 5 | First Temperature | Second Temperature | First Factor: Fuel Flow Rate I | Second Factor: Heating Amount II | Third Factor: Cooling Amount III | Priority |
|-----|----------------|-------------------|--------------------|-----|------|------|----------|
| 1 | 164 | ↑ | — | ↓ | ↑ | ↓ | II > I > III (Relatively High Temperature) or II > III > I (Relatively Low Temperature) |
| 2 | 163 | ↑ | ↓ | ↓ | ↑ | ↑ | III > II > I |
| 3 | 166 | → | — | → | → | → | — |
| 4 | 165 | → | ↓ | ↑ | ↓ | ↑ | III > II > I |
| 5 | 162 | ↓ | — | ↑ | ↓ | → | |
| 6 | 161 | ↓ | ↓ | ↑ | ↓ | ↑ | |

Table 1 shows the adjustment of the first to third factors and the priority levels in correspondence with the first and second temperatures. In Table 1, the numbers written in the column below "STEP in FIG. 5" denote the steps corresponding to FIG. 5.

Figure 10A:
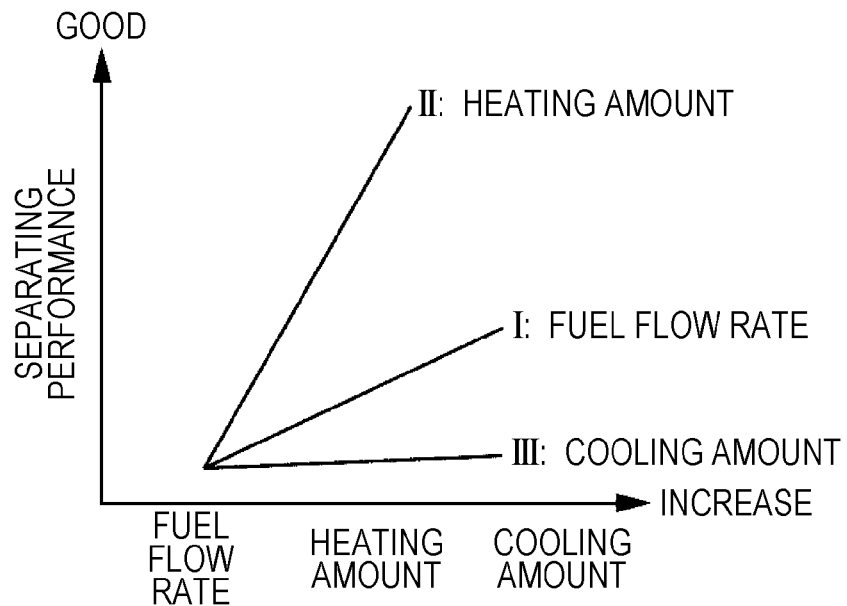
FIG. 10A and FIG. 10B illustrate the relationship between separating performance and controlling of first to third factors.
Figure 10B:
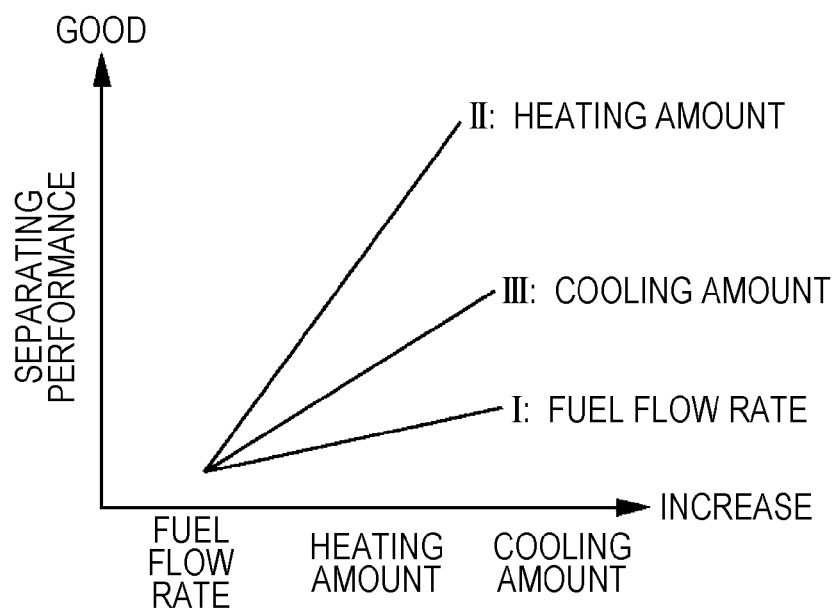

The symbols "↑", "→", "↓", and "-" in the columns below the first temperature and the second temperature respectively FIG. 10A illustrates how increase and reduction of the factors affect the fuel separating performance in a case where the separator temperature TF1 (i.e., the first temperature) is relatively low (at, for example, 50° C.). FIG. 10B illustrates how increase and reduction of the factors affect the fuel separating performance in a case where the separator temperature TF1 (i.e., the first temperature) is relatively high (at, for example, 75° C.). As shown in FIG. 10A, when the separator temperature TF1 (i.e., the first temperature) is relatively low, the second factor has the highest effect on the separating performance, the first factor has the second highest effect, and the third factor has the lowest effect. As shown in FIG. 10B, when the separator temperature TF1 (i.e., the first temperature) is relatively high, the second factor has the highest effect on the separating performance, the third factor has the second highest effect, and the first factor has the lowest effect.

Therefore, it is preferable that the adjustment of the factors be performed based on the priority levels shown in the rightmost column of Table 1.

In particular, because the second factor has the highest effect on the separating performance, if the separator temperature TF1 (i.e., the first temperature) is to be increased, it is desirable that the second factor be adjusted with the highest priority. In contrast, if the separator temperature TF1 (i.e., the first temperature) is to be decreased, it is desirable that the second factor be adjusted last.

For example, when the separator temperature TF1 (i.e., the first temperature) is to be increased and the raw-fuel-tank temperature TF2 (i.e., the second temperature) does not need to be decreased (STEP 164 in FIG. 5), it is preferable that increase of the second factor be performed with the highest priority (see the row corresponding to No. 1 in Table 1). In this case, if the separator temperature TF1 (i.e., the first temperature) is relatively low (at, for example, 50° C.), it is preferable that the third factor (i.e., the amount of air supplied by the cooling fan 90) be adjusted with higher priority over the first factor (i.e., the flow rate of raw fuel F0) since the separating performance is lowered by a small degree by reducing the third factor (i.e., the amount of air supplied by the cooling fan 90). Furthermore, if the separator temperature TF1 (i.e., the first temperature) is relatively high although not reaching the first low reference temperature TLF1, it is preferable that the first factor (i.e., the flow rate of raw fuel F0) be adjusted with higher priority over the third factor (i.e., the amount of air supplied by the cooling fan 90) since the separating performance is lowered by a large degree by reducing the third factor (i.e., the amount of air supplied by the cooling fan 90).

When the separator temperature TF1 (i.e., the first temperature) is to be increased and the raw-fuel-tank temperature TF2 (i.e., the second temperature) is to be decreased (STEP 163 in FIG. 5), it is necessary to increase the third factor. With regard to the first factor and the second factor, it is preferable that the second factor be adjusted with higher priority over the first factor (see the row corresponding to No. 2 in Table 1).

When the separator temperature TF1 (i.e., the first temperature) is to be maintained and the raw-fuel-tank temperature TF2 (i.e., the second temperature) is to be decreased (STEP 165 in FIG. 5), it is preferable that increase of the third factor be performed with the highest priority. With regard to the first factor and the second factor, it is preferable that increase of the first factor be performed with higher priority (see the row corresponding to No. 4 in Table 1).

When the separator temperature TF1 (i.e., the first temperature) is to be decreased and the raw-fuel-tank temperature TF2 (i.e., the second temperature) does not need to be decreased (STEP 162 in FIG. 5), it is preferable that the increase of the third factor be performed with the highest priority. With regard to the first factor and the second factor, it is preferable that increase of the first factor be performed with higher priority (see the row corresponding to No. 5 in Table 1).

When the separator temperature TF1 (i.e., the first temperature) is to be decreased and the raw-fuel-tank temperature TF2 (i.e., the second temperature) is to be decreased (STEP 161 in FIG. 5), it is preferable that increase of the third factor be performed with the highest priority. With regard to the first factor and the second factor, it is preferable that increase of the first factor be performed with higher priority (see the row corresponding to No. 6 in Table 1).

Second Temperature Control Process (Second Embodiment)

A second temperature control process, according to a second embodiment of the present application, executed by the controller 70 will now be described with reference to FIG. 9. The controller 70 is programmed to execute the second temperature control process in place of the first temperature control process. The controller 70 repeatedly executes the following second temperature control process.

Figure 9:
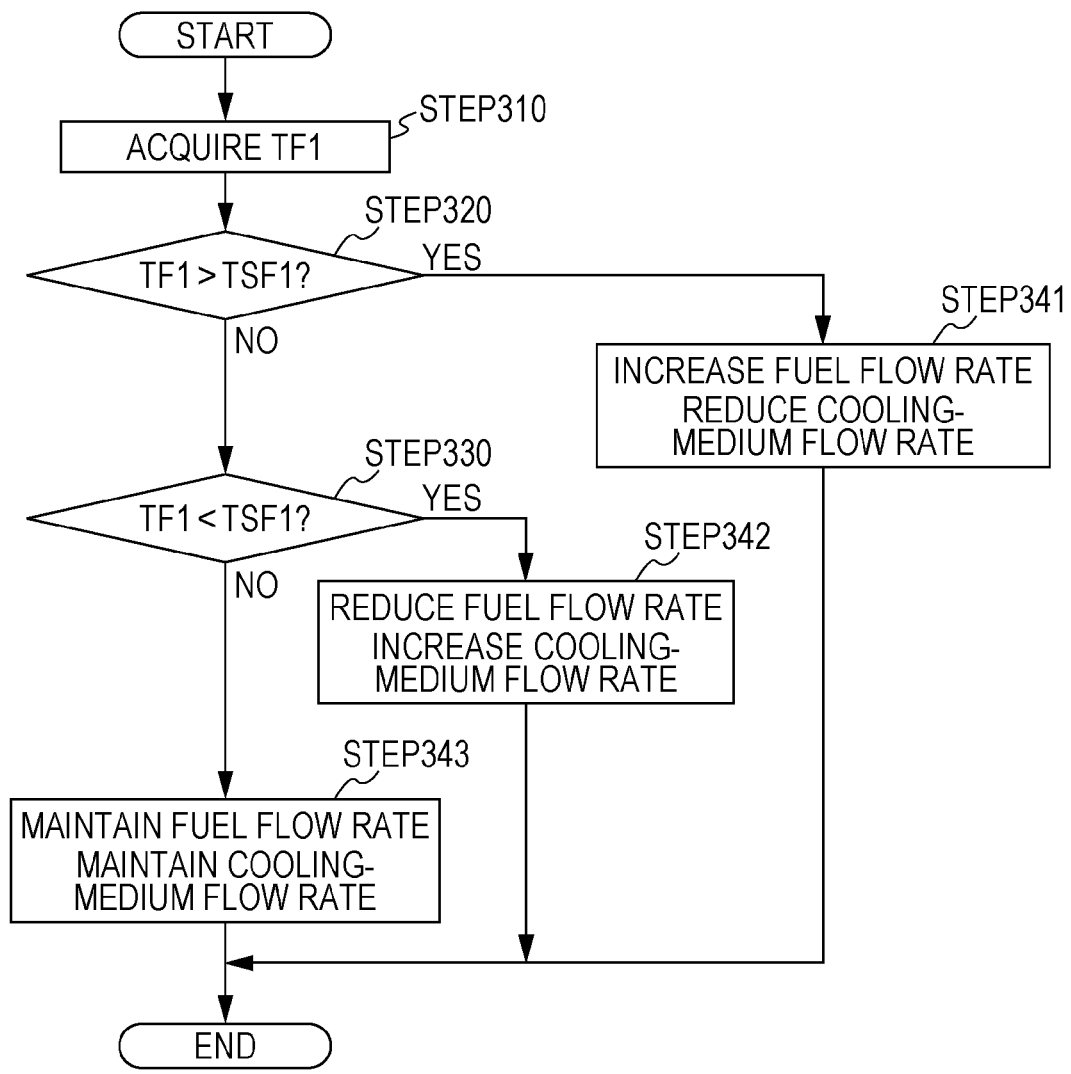
FIG. 9 is a flowchart of a second temperature control process.

First, a separator temperature TF1 is acquired from the separator temperature sensor 82 (STEP 310 in FIG. 9).

Subsequently, it is determined whether or not the separator temperature TF1 is higher than the first reference temperature TSF1 (STEP 320 in FIG. 9). If a positive determination result is obtained (i.e., YES in STEP 320 in FIG. 9), the flow rate of raw fuel F0 (i.e., the first factor) is increased and the flow rate of cooling medium (i.e., the second factor) is reduced (STEP 341 in FIG. 9). In this case, since the amount by which the raw fuel F0 is heated per unit flow rate is reduced, the temperature of the raw fuel F0 decreases.

If a negative determination result is obtained (i.e., NO in STEP 320 in FIG. 9), it is determined whether or not the separator temperature TF1 is lower than the first reference temperature TSF1 (STEP 330 in FIG. 9).

If a positive determination result is obtained in STEP 330 (i.e., YES in STEP 330 in FIG. 9 when the separator temperature TF1 is lower than the first reference temperature TSF1), the flow rate of raw fuel F0 (i.e., the first factor) is reduced and the flow rate of cooling medium (i.e., the second factor) is increased (STEP 342 in FIG. 9). In this case, since the amount by which the raw fuel F0 is heated per unit flow rate is increased, the temperature of the raw fuel F0 increases.

If a negative determination result is obtained in STEP 330 (i.e., NO in STEP 330 in FIG. 9 when the separator temperature TF1 is not lower than the first reference temperature TSF1), the flow rate of raw fuel F0 (i.e., the first factor) and the flow rate of cooling medium (i.e., the second factor) are not to be changed (STEP 343 in FIG. 9).

When the series of above-described steps is completed, the present cycle of the second temperature control process ends, and a subsequent cycle commences.

With the second temperature control process, the flow rate of raw fuel F0 (i.e., the first factor) and the flow rate of cooling medium (i.e., the second factor) are continuously adjusted in accordance with the relationship between the separator temperature TF1 and the first reference temperature TSF1 so that the separator temperature TF1 is quickly set to the first reference temperature TSF1 (or to within a predetermined temperature range including the first reference temperature TSF1).

TABLE 2

| No. | STEP in FIG. 9 | First Temperature | First Factor: Fuel Flow Rate I | Second Factor: Heating Amount II | Third Factor: Cooling Amount III | Priority |
|---|---|---|---|---|---|---|
| 1 | 342 | ↑ | ↓ | ↑ | ↓ | II > I > III (Relatively High Temperature) or II > III > I (Relatively Low Temperature) |
| 2 | 343 | → | → | → | → | — |
| 3 | 341 | ↓ | ↑ | ↓ | ↑ | III > I > II |

In Table 2, the numbers written in the column below "STEP in FIG. 9" denote the steps corresponding to FIG. 9. Other symbols have the same meanings as those in Table 1.

In the second temperature control process, the flow rate of raw fuel F0 (i.e., the first factor), the flow rate of cooling medium (i.e., the second factor), and the amount of air supplied by the cooling fan 90 (i.e., the third factor) may all be adjusted, as in the first temperature control process. Alternatively, as shown in Table 2, at least one of the flow rate of raw fuel F0 (i.e., the first factor), the flow rate of cooling medium (i.e., the second factor), and the amount of air supplied by the cooling fan 90 (i.e., the third factor) may be adjusted, as in the first temperature control process. For example, when the separator temperature TF1 is to be increased, at least one of reduction of the first factor, increase of the second factor, and reduction of the third factor is performed, as shown in the row corresponding to No. 1 in Table 2. When the separator temperature TF1 is to be decreased, at least one of increase of the first factor, reduction of the second factor, and increase of the third factor is performed, as shown in the row corresponding to No. 3 in Table 2.

When adjusting the aforementioned factors, it is preferable that at least two of the factors be adjusted. By adjusting at least two of the factors, the separator temperature TF1 (i.e., the first temperature) can be controlled more readily.

As described above, since each factor affects the separating performance differently, it is preferable that the adjustment of the factors be performed based on the priority levels shown in the rightmost column of Table 2.

In particular, because the second factor has the highest effect on the separating performance, if the separator temperature TF1 (i.e., the first temperature) is to be increased, it is desirable that the second factor be adjusted with the highest priority. In contrast, if the separator temperature TF1 (i.e., the first temperature) is to be decreased, it is desirable that the second factor be adjusted last.

For example, when the separator temperature TF1 (i.e., the first temperature) is to be increased (STEP 342 in FIG. 9), it is preferable that increase of the second factor be performed with the highest priority (see the row corresponding to No. 1 in Table 2). In this case, if the separator temperature TF1 (i.e., the first temperature) is relatively low (at, for example, 50° C.), it is preferable that the third factor (i.e., the amount of air supplied by the cooling fan 90) be adjusted with higher priority over the first factor (i.e., the flow rate of raw fuel F0) since the separating performance is lowered by a small degree by reducing the third factor (i.e., the amount of air supplied by the cooling fan 90). Furthermore, if the separator temperature TF1 (i.e., the first temperature) is relatively high although not reaching the first low reference temperature TLF1, it is preferable that the first factor (i.e., the flow rate of raw fuel F0) be adjusted with higher priority over the third factor (i.e., the amount of air supplied by the cooling fan 90) since the separating performance is lowered by a large degree by reducing the third factor (i.e., the amount of air supplied by the cooling fan 90).

When the separator temperature TF1 (i.e., the first temperature) is to be decreased (STEP 341 in FIG. 9), it is preferable that the adjustment of the factors be performed in the following priority order: increase of the third factor, increase of the first factor, and reduction of the second factor (see the row corresponding to No. 3 in Table 2).

According to a first aspect of the embodiment, a fuel supply apparatus selectively supplies first fuel and second fuel or raw fuel to an internal combustion engine or simultaneously supplies the first fuel and the second fuel or the raw fuel with a specified mixture ratio to the internal combustion engine. The first fuel is separated from the raw fuel and contains a larger amount of high-octane component than the raw fuel. The second fuel is separated from the raw fuel and contains a larger amount of low-octane component than the raw fuel. The fuel supply apparatus includes a raw-fuel tank that stores the raw fuel; a separator that separates the raw fuel into the first fuel and the second fuel; a heater configured to heat the raw fuel flowing downstream of the raw-fuel tank and upstream of the separator in a raw-fuel path along which the raw fuel is delivered from the raw-fuel tank to the separator by a raw-fuel delivery device; a cooler configured to cool the second fuel flowing downstream of the separator and upstream of the raw-fuel tank in a second-fuel path along which the second fuel is delivered from the separator to the raw-fuel tank; and an adjustment mechanism that performs adjustment of at least one of a first factor, a second factor, and a third factor so that a first temperature, which is a temperature of the separator, is set to within a predetermined first temperature range or is set to a first target temperature. The first factor is a flow rate of the raw fuel, the second factor is an amount by which the raw fuel is heated in the heater, and the third factor is an amount by which the second fuel is cooled in the cooler.

According to the first aspect, the adjustment of at least one of the above factors is performed so that the first temperature is set to within the first temperature range or is set to the first target temperature, whereby the responsiveness of the first temperature can be controlled to a desired form more readily, as compared to a case where the at least one factor is not adjusted. Consequently, the first temperature can be stably controlled to within the first temperature range or to the first target temperature.

In the first aspect of the embodiment, the adjustment mechanism may perform at least one of increase of the first factor, reduction of the second factor, and increase of the third factor when the first temperature is to be decreased.

Accordingly, when the first temperature (i.e., the temperature of the separator) is to be decreased, the first factor is increased, the second factor is reduced, or the third factor is increased. Thus, the temperature of the raw fuel is decreased by reducing the amount by which the raw fuel is heated per unit flow rate or by increasing the amount by which the second fuel is cooled per unit flow rate, whereby an increase in temperature of the raw fuel is suppressed. As a result, the responsiveness of the first temperature (i.e., the temperature of the separator) can be controlled to a desired form more readily. Consequently, the first temperature (i.e., the temperature of the separator) can be stably controlled to within the first temperature range or to the first target temperature.

In the first aspect of the embodiment, the adjustment mechanism may perform at least one of reduction of the first factor, increase of the second factor, and reduction of the third factor when the first temperature is to be increased.

Accordingly, the first factor is reduced, the second factor is increased, or the third factor is reduced. Thus, the temperature of the raw fuel is increased by increasing the amount by which the raw fuel is heated per unit flow rate or by reducing the amount by which the second fuel is cooled per unit flow rate, whereby the temperature of the raw fuel flowing into the separator is further increased. As a result, the responsiveness of the first temperature (i.e., the temperature of the separator) can be controlled to a desired form more readily. Consequently, the first temperature (i.e., the temperature of the separator) can be stably controlled to within the first temperature range or to the first target temperature.

In the first aspect of the embodiment, the adjustment mechanism may perform the adjustment of at least one of the first to third factors so that a second temperature, which is a temperature of the raw fuel stored in the raw-fuel tank, is set to within a predetermined second temperature range having an upper-limit temperature that is lower than a lower-limit temperature of the first temperature range, or is set to a second target temperature that is lower than the lower-limit temperature of the first temperature range.

Accordingly, at least one of the first to third factors is adjusted so that the first temperature is set to within the first temperature range or is set to the first target temperature, and so that the second temperature is set to within the predetermined second temperature range having the upper-limit temperature that is lower than the lower-limit temperature of the first temperature range, or is set to the second target temperature that is lower than the lower-limit temperature of the first temperature range.

The fuel supply apparatus sometimes sets the temperature (i.e., the second temperature) of the raw-fuel tank to within the predetermined second temperature range having the upper-limit temperature that is lower than the lower-limit temperature of the first temperature range or to the second target temperature that is lower than the lower-limit temperature of the first temperature range so as to prevent alteration or evaporation of the raw fuel or defective circulation of the raw fuel caused by excessive heating of the raw fuel.

Because the upper-limit temperature of the second temperature range is lower than the lower-limit temperature of the first temperature range, the temperature of the separated second fuel is normally higher than the upper-limit temperature of the second temperature range or the second target temperature. Therefore, it is necessary to cool the separated second fuel before it is delivered to the raw-fuel tank. In order to cool the second fuel, at least one of the first to third factors needs to be adjusted.

When the second temperature is set to within the second temperature range or to the second target temperature by performing the adjustment, the temperature of the raw fuel to be delivered from the raw-fuel tank to the raw-fuel path becomes stable, thereby allowing for easier adjustment of the first temperature (i.e., the temperature of the separator).

In the first aspect of the embodiment, the adjustment mechanism may perform at least one of increase of the first factor, reduction of the second factor, and increase of the third factor when the first temperature is to be decreased and the second temperature is to be decreased.

Accordingly, by increasing the first factor or by reducing the second factor, an increase in temperature of the raw fuel is suppressed. As a result, an amount of heat entering the separator is reduced, causing the first temperature (i.e., the temperature of the separator) to decrease. In this case, since the temperature of the second fuel produced as the result of separating the raw fuel decreases, the temperature (i.e., the second temperature) of the raw fuel in the raw-fuel tank into which the second fuel flows also decreases.

Alternatively, by increasing the third factor, the amount by which the second fuel is cooled is increased so that the temperature (i.e., the second temperature) of the raw-fuel tank decreases, resulting in an increase in the first temperature (i.e., the temperature of the separator).

As a result, the responsiveness of the first temperature and the second temperature can be controlled to a desired form more readily. Consequently, the first temperature can be stably controlled to within the first temperature range or to the first target temperature, and the second temperature can be stably controlled to within the second temperature range or to the second target temperature.

In the fuel supply apparatus according to the first aspect of the embodiment, the adjustment mechanism may perform at least one of increase of the first factor, reduction of the second factor, and increase of the third factor when the first temperature is to be decreased and the second temperature does not need to be decreased.

Accordingly, by increasing the first factor or by reducing the second factor, an increase in temperature of the raw fuel is suppressed. As a result, an amount of heat entering the separator is reduced, causing the first temperature (i.e., the temperature of the separator) to decrease. In this case, the temperature of the second fuel produced as the result of separating the raw fuel decreases.

Alternatively, by increasing the third factor, the amount by which the second fuel is cooled is increased, causing the temperature of the second fuel produced as the result of separating the raw fuel to decrease. Since the temperature of the raw fuel, which is to be supplied to the separator, in the raw-fuel tank is prevented from increasing by decreasing the temperature of the second fuel, the first temperature (i.e., the temperature of the separator) ultimately decreases.

As a result, the responsiveness of the first temperature and the second temperature can be controlled to a desired form more readily. Consequently, the first temperature can be stably controlled to within the first temperature range or to the first target temperature, and the second temperature can be stably controlled to within the second temperature range or to the second target temperature.

In the first aspect of the embodiment, the adjustment mechanism may increase the third factor and perform at least one of reduction of the first factor and increase of the second factor when the first temperature is to be increased and the second temperature is to be decreased.

Accordingly, when the first temperature (i.e., the temperature of the separator) is to be increased and the second temperature (i.e., the temperature of the raw-fuel tank) is to be decreased, the third factor is increased, and at least one of reduction of the first factor and increase of the second factor is performed.

With regard to the first temperature (i.e., the temperature of the separator), the amount by which the raw fuel is heated per unit flow rate in the heater is increased by reducing the first factor or by increasing the second factor. Therefore, the temperature of the raw fuel flowing into the separator quickly increases. Consequently, the first temperature increases.

On the other hand, with regard to the second temperature (i.e., the temperature of the raw-fuel tank), the amount by which the second fuel is cooled per unit flow rate in the cooler is increased by increasing the third factor. Therefore, the temperature of the second fuel flowing into the raw-fuel tank quickly decreases, causing the temperature (i.e., the second temperature) of the raw-fuel tank to decrease.

As a result, the responsiveness of the first temperature and the second temperature can be controlled to a desired form more readily. Consequently, the first temperature can be stably controlled to within the first temperature range or to the first target temperature, and the second temperature can be stably controlled to within the second temperature range or to the second target temperature.

In the first aspect of the embodiment, the adjustment mechanism may perform at least one of reduction of the first factor, increase of the second factor, and reduction of the third factor when the first temperature is to be increased and the second temperature does not need to be decreased.

Accordingly, when the first temperature (i.e., the temperature of the separator) is to be increased and the second temperature (i.e., the temperature of the raw-fuel tank) does not need to be decreased, at least one of reduction of the first factor, increase of the second factor, and reduction of the third factor is performed. By reducing the first factor or by increasing the second factor, the amount by which the raw fuel is heated per unit flow rate in the heater is increased so that the first temperature is directly increased.

Furthermore, by reducing the third factor, the amount by which the second fuel is cooled per unit flow rate is reduced, so that the temperature of the second fuel flowing into the raw-fuel tank increases. Thus, the temperature (i.e., the second temperature) of the raw fuel stored in the raw-fuel tank increases, causing the first temperature (i.e., the temperature of the separator) to ultimately increase.

As a result, the responsiveness of the first temperature and the second temperature can be controlled to a desired form more readily. Consequently, the first temperature can be stably controlled to within the first temperature range or to the first target temperature.

In the first aspect of the embodiment, the adjustment mechanism may perform at least one of increase of the first factor, reduction of the second factor, and increase of the third factor when the second temperature is to be decreased while the first temperature is to be maintained within the first temperature range.

Accordingly, when the second temperature (i.e., the temperature of the raw-fuel tank) is to be decreased while the first temperature (i.e., the temperature of the separator) is to be maintained within the first temperature range, at least one of increase of the first factor, reduction of the second factor, and increase of the third factor is performed. By increasing the first factor or by reducing the second factor, the amount by which the raw fuel is heated per unit flow rate in the heater is reduced so that the temperature of the second fuel produced as the result of separating the raw fuel decreases. Alternatively, by increasing the third factor, the amount by which the second fuel is cooled is increased so that the temperature of the second fuel flowing into the raw-fuel tank decreases. Thus, the second temperature (i.e., the temperature of the raw-fuel tank) decreases.

As a result, the responsiveness of the first temperature and the second temperature can be controlled to a desired form more readily. Consequently, the first temperature can be stably controlled to within the first temperature range or to the first target temperature, and the second temperature can be stably controlled to within the second temperature range or to the second target temperature.

In the first aspect of the embodiment, the adjustment mechanism may perform the adjustment so as to decrease the first temperature when the first temperature exceeds a predetermined first high reference temperature that is lower than an upper-limit temperature of the first temperature range and that is higher than the lower-limit temperature of the first temperature range. The adjustment mechanism may perform the adjustment so as to increase the first temperature when the first temperature is below a predetermined first low reference temperature that is lower than or equal to the first high reference temperature and that is higher than the lower-limit temperature of the first temperature range. The adjustment mechanism may perform the adjustment so as to decrease the second temperature when the second temperature exceeds a predetermined second reference temperature that is lower than the upper-limit temperature of the second temperature range.

Accordingly, the first to third factors are adjusted before the first temperature reaches the upper-limit temperature or the lower-limit temperature of the first temperature range and before the second temperature reaches the upper-limit temperature or the lower-limit temperature of the second temperature range by taking into account the inevitably-existing responsiveness of the first temperature and the second temperature with respect to the adjustment of the factors. Thus, the effect of the responsiveness is reduced or eliminated, whereby the first temperature can be reliably set to within the first temperature range and the second temperature can be reliably set to within the second temperature range.

In the first aspect of the embodiment, the fuel supply apparatus may further include a cooling-medium circulation path configured to circulate a cooling medium for cooling the internal combustion engine and to cause the raw fuel flowing along the raw-fuel path and the cooling medium to exchange heat with each other in the heater. In this case, the adjustment mechanism may be configured to perform the adjustment of the second factor by adjusting a flow rate of the cooling medium in the cooling-medium circulation path.

Accordingly, when the raw fuel and the cooling medium exchange heat with each other in the heater, the adjustment of the second factor is performed by adjusting the flow rate of the cooling medium, whereby the adjustment of the second factor can be performed more readily.

In the first aspect of the embodiment, the cooler may include a cooling fan, and the adjustment mechanism may be configured to perform the adjustment of the third factor by adjusting an amount of air supplied by the cooling fan.

Accordingly, since the cooler includes the cooling fan and the adjustment of the third factor is performed by adjusting the amount of air supplied by the cooling fan, the adjustment of the third factor can be performed more readily.

A second aspect of the embodiment provides a program causing a computer, which is installed in a fuel supply apparatus and is capable of accessing an adjustment mechanism, to execute a process. Specifically, the fuel supply apparatus selectively supplies first fuel and second fuel or raw fuel to an internal combustion engine or simultaneously supplies the first fuel and the second fuel or the raw fuel with a specified mixture ratio to the internal combustion engine. The first fuel is separated from the raw fuel and contains a larger amount of high-octane component than the raw fuel. The second fuel is separated from the raw fuel and contains a larger amount of low-octane component than the raw fuel. The fuel supply apparatus includes a raw-fuel tank that stores the raw fuel; a separator that separates the raw fuel into the first fuel and the second fuel; a heater configured to heat the raw fuel flowing downstream of the raw-fuel tank and upstream of the separator in a raw-fuel path along which the raw fuel is delivered from the raw-fuel tank to the separator by a raw-fuel delivery device; a cooler configured to cool the second fuel flowing downstream of the separator and upstream of the raw-fuel tank in a second-fuel path along which the second fuel is delivered from the separator to the raw-fuel tank; and the adjustment mechanism that performs adjustment of at least one of a flow rate of the raw fuel, a heating amount in the heater, and a cooling amount in the cooler. The program causes the computer to repeatedly execute an adjustment step for causing the adjustment mechanism to perform adjustment of at least one of a first factor, a second factor, and a third factor so that a first temperature, which is a temperature of the separator, is set to within a predetermined first temperature range or is set to a first target temperature. The first factor is the flow rate of the raw fuel, the second factor is the amount by which the raw fuel is heated in the heater, and the third factor is the amount by which the second fuel is cooled in the cooler.

According to the second aspect, in the fuel supply apparatus equipped with the computer, the raw fuel is delivered from the raw-fuel tank to the separator via the heater by the raw-fuel delivery device and is subsequently separated into the first fuel and the second fuel by the separator. Then, the separated second fuel is returned to the raw-fuel tank via the cooler.

The program according to the second aspect causes the computer to repeatedly execute the adjustment step for adjusting at least one of the first to third factors so that the first temperature is set to within the predetermined temperature range or is set to the first target temperature.

By adjusting the flow rate of the raw fuel (i.e., the first factor) and the heating amount (i.e., the second factor) in the heater, the amount by which the raw fuel is heated per unit flow rate in the heater changes. As a result, the temperature of the raw fuel flowing into the separator changes so that the temperature of the separator is adjusted.

Furthermore, by adjusting the cooling amount (i.e., the third factor) in the cooler, the amount by which the second fuel, produced as the result of separating the raw fuel, is cooled per unit flow rate changes. As a result, the temperature of the second fuel flowing into the raw-fuel tank changes and affects the temperature of the raw fuel stored in the raw-fuel tank, whereby the first temperature is adjusted.

Since at least one of the flow rate of the raw fuel, the heating amount in the heater, and the cooling amount in the cooler is continuously adjusted so that the first temperature is set to within the predetermined temperature range, the first temperature can be quickly set to within the predetermined first temperature range or to the first target temperature.

In the second aspect of the embodiment, the adjustment step may include adjusting the third factor or at least one of the first to third factors so that the first temperature is set to within the first temperature range or is set to the first target temperature and so that a second temperature, which is a temperature of the raw fuel stored in the raw-fuel tank, is set to within a predetermined second temperature range having an upper-limit temperature that is lower than a lower-limit temperature of the first temperature range, or is set to a second target temperature.

Accordingly, since at least one of the flow rate of the raw fuel, the heating amount in the heater, and the cooling amount in the cooler is continuously adjusted so that the first temperature is set to within the first temperature range or to the first target temperature and so that the second temperature is set to within the second temperature range or to the second target temperature, the first temperature can be quickly set to within the first temperature range and the second temperature can be quickly set to within the second temperature range.

In the first aspect of the embodiment, the fuel supply apparatus may further include a circulation control element that actuates the raw-fuel delivery device in response to reception of a command for stopping the internal combustion engine if at least one of a condition in which the first temperature is higher than or equal to a predetermined first reference temperature and a condition in which a temperature of the cooling medium is higher than or equal to a predetermined cooling-medium reference temperature is satisfied; and a stopping element that stops the raw-fuel delivery device when the at least one condition is not satisfied.

Accordingly, when stopping the internal combustion engine, the raw-fuel delivery device is actuated if the temperature of the separator is higher than or equal to a predetermined temperature (e.g. an appropriate temperature for continuing the separation) or if the temperature of the cooling medium is higher than or equal to a predetermined temperature (e.g. an appropriate temperature for increasing the temperature of the separator), whereby the fuel separation process can be performed efficiently.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel supply apparatus comprising:
a raw-fuel tank to store raw fuel;
a separator to separate the raw fuel into a first fuel and a second fuel, the first fuel containing a larger amount of high-octane component than an amount of high-octane component of the raw fuel, the second fuel containing a larger amount of low-octane component than an amount of low-octane component of the raw fuel;
a heater to heat the raw fuel flowing downstream of the raw-fuel tank and upstream of the separator in a raw-fuel path along which the raw fuel is delivered from the raw-fuel tank to the separator by a raw-fuel delivery device;
a cooler to cool the second fuel flowing downstream of the separator and upstream of the raw-fuel tank in a second-fuel path along which the second fuel is delivered from the separator to the raw-fuel tank;
an adjustment mechanism to perform adjustment of at least one of a first factor, a second factor, and a third factor so that a first temperature of the separator is set to within a predetermined first temperature range or is set to a first target temperature, the first factor comprising a flow rate of the raw fuel, the second factor comprising an amount by which the raw fuel is heated in the heater, the third factor comprising an amount by which the second fuel is cooled in the cooler; and
a circulation control element to actuate the raw-fuel delivery device in response to reception of a command for stopping an internal combustion engine if at least one of a first condition in which the first temperature is higher than or equal to a predetermined first reference temperature and a second condition in which a temperature of the cooling medium is higher than or equal to a predetermined cooling-medium reference temperature is satisfied.

2. The fuel supply apparatus according to claim 1,
wherein the adjustment mechanism performs at least one of increase of the first factor, reduction of the second factor, and increase of the third factor when the first temperature is to be decreased.

3. The fuel supply apparatus according to claim 1,
wherein the adjustment mechanism performs at least one of reduction of the first factor, increase of the second factor, and reduction of the third factor when the first temperature is to be increased.

4. The fuel supply apparatus according to claim 1,
wherein the adjustment mechanism is provided to perform the adjustment of at least one of the first to third factors so that a second temperature of the raw fuel stored in the raw-fuel tank is set to within a predetermined second temperature range having an upper-limit temperature that is lower than a lower-limit temperature of the first temperature range, or is set to a second target temperature that is lower than the lower-limit temperature of the first temperature range.

5. The fuel supply apparatus according to claim 4,
wherein the adjustment mechanism performs at least one of increase of the first factor, reduction of the second factor, and increase of the third factor when the first temperature is to be decreased and the second temperature is to be decreased.

6. The fuel supply apparatus according to claim 4,
wherein the adjustment mechanism performs at least one of increase of the first factor, reduction of the second factor, and increase of the third factor when the first temperature is to be decreased and the second temperature does not need to be decreased.

7. The fuel supply apparatus according to claim 4,
wherein the adjustment mechanism increases the third factor and performs at least one of reduction of the first factor and increase of the second factor when the first temperature is to be increased and the second temperature is to be decreased.

8. The fuel supply apparatus according to claim 4,
wherein the adjustment mechanism performs at least one of reduction of the first factor, increase of the second factor, and reduction of the third factor when the first temperature is to be increased and the second temperature does not need to be decreased.

9. The fuel supply apparatus according to claim 4,
wherein the adjustment mechanism performs at least one of increase of the first factor, reduction of the second factor, and increase of the third factor when the second temperature is to be decreased while the first temperature is to be maintained within the first temperature range.

10. The fuel supply apparatus according to claim 4,
wherein the adjustment mechanism performs the adjustment of at least one of the first to third factors so as to decrease the first temperature when the first temperature exceeds a predetermined first high reference temperature that is lower than an upper-limit temperature of the first temperature range and that is higher than the lower-limit temperature of the first temperature range,
wherein the adjustment mechanism performs the adjustment of at least one of the first to third factors so as to increase the first temperature when the first temperature is below a predetermined first low reference temperature that is lower than or equal to the predetermined first high reference temperature and that is higher than the lower-limit temperature of the first temperature range, and
wherein the adjustment mechanism performs the adjustment of at least one of the first to third factors so as to decrease the second temperature when the second temperature exceeds a predetermined second reference temperature that is lower than an upper-limit temperature of the second temperature range.

11. The fuel supply apparatus according to claim 1, further comprising:
a cooling-medium circulation path along which a cooling medium is circulated to cool the internal combustion engine, the cooling-medium circulation path being provided to cause the raw fuel flowing along the raw-fuel path and the cooling medium to exchange heat with each other in the heater,
wherein the adjustment mechanism is provided to perform adjustment of the second factor by adjusting a flow rate of the cooling medium in the cooling-medium circulation path.

12. The fuel supply apparatus according to claim 11, further comprising:
a stopping element to stop the raw-fuel delivery device when the first condition and the second condition are not satisfied.

13. The fuel supply apparatus according to claim 1,
wherein the cooler includes a cooling fan, and
wherein the adjustment mechanism is provided to perform adjustment of the third factor by adjusting an amount of air supplied by the cooling fan.

14. The fuel supply apparatus according to claim 1,
wherein the fuel supply apparatus is provided to selectively supply the first fuel and one of the second fuel and the raw fuel to the internal combustion engine or to simultaneously supply the first fuel and one of the second fuel and the raw fuel with a specified mixture ratio to the internal combustion engine.

15. A non-transitory computer-readable storage medium storing a program for causing a computer to execute a process comprising:
performing adjustment of at least one of a first factor, a second factor, and a third factor repeatedly with an adjustment mechanism of a fuel supply apparatus so that a first temperature of a separator of the fuel supply apparatus is set to within a predetermined first temperature range or is set to a first target temperature, the separator being provided to separate raw fuel into a first fuel and a second fuel, the first fuel containing a larger amount of high-octane component than an amount of high-octane component of the raw fuel, the second fuel containing a larger amount of low-octane component than an amount of low-octane component of the raw fuel, the first factor comprising a flow rate of the raw fuel, the second factor comprising an amount by which the raw fuel is heated in a heater of the fuel supply apparatus, the third factor comprising an amount by which the second fuel is cooled in a cooler of the fuel supply apparatus, the computer being installed in the fuel supply apparatus and being configured to access the adjustment mechanism; and
actuating a raw-fuel delivery device in response to reception of a command for stopping an internal combustion engine if at least one of a first condition in which the first temperature is higher than or equal to a predetermined first reference temperature and a second condition in which a temperature of the cooling medium is higher than or equal to a predetermined cooling-medium reference temperature is satisfied.

16. The non-transitory computer-readable storage medium according to claim 15,
wherein the fuel supply apparatus is provided to selectively supply the first fuel and one of the second fuel and the raw fuel to the internal combustion engine or to simultaneously supply the first fuel and one of the second fuel and the raw fuel with a specified mixture ratio to the internal combustion engine,
wherein the fuel supply apparatus includes a raw-fuel tank, the separator, the heater, the cooler, and the adjustment mechanism,
wherein the raw-fuel tank is provided to store the raw fuel,
wherein the heater is provided to heat the raw fuel flowing downstream of the raw-fuel tank and upstream of the separator in a raw-fuel path along which the raw fuel is delivered from the raw-fuel tank to the separator by the raw-fuel delivery device,
wherein the cooler is provided to cool the second fuel flowing downstream of the separator and upstream of the raw-fuel tank in a second-fuel path along which the second fuel is delivered from the separator to the raw-fuel tank, and
wherein the adjustment mechanism is provided to adjust at least one of the flow rate of the raw fuel, a heating amount in the heater, and a cooling amount in the cooler.

17. The non-transitory computer-readable storage medium according to claim 16,
wherein the adjusting of at least one of the first to third factors includes adjusting the third factor or at least one of the first to third factors
so that the first temperature is set to within the first temperature range or is set to the first target temperature, and
so that a second temperature of the raw fuel stored in the raw-fuel tank is set to within a predetermined second temperature range having an upper-limit temperature that is lower than a lower-limit temperature of the first temperature range, or is set to a second target temperature.

18. A method of controlling a fuel supply apparatus, comprising:
performing adjustment of at least one of a first factor, a second factor, and a third factor repeatedly with an adjustment mechanism of a fuel supply apparatus so that a first temperature of a separator of the fuel supply apparatus is set to within a predetermined first temperature range or is set to a first target temperature, the separator being provided to separate raw fuel into a first fuel and a second fuel, the first fuel containing a larger amount of high-octane component than an amount of high-octane component of the raw fuel, the second fuel containing a larger amount of low-octane component than an amount of low-octane component of the raw fuel, the first factor comprising a flow rate of the raw fuel, the second factor comprising an amount by which the raw fuel is heated in a heater of the fuel supply apparatus, the third factor comprising an amount by which the second fuel is cooled in a cooler of the fuel supply apparatus, a computer being installed in the fuel supply apparatus and being configured to access the adjustment mechanism; and
actuating a raw-fuel delivery device in response to reception of a command for stopping an internal combustion engine if at least one of a first condition in which the first temperature is higher than or equal to a predetermined first reference temperature and a second condition in which a temperature of the cooling medium is higher than or equal to a predetermined cooling-medium reference temperature is satisfied.

19. The method according to claim 18,
wherein the fuel supply apparatus is provided to selectively supply the first fuel and one of the second fuel and the raw fuel to the internal combustion engine or to simultaneously supply the first fuel and one of the second fuel and the raw fuel with a specified mixture ratio to the internal combustion engine,
wherein the fuel supply apparatus includes a raw-fuel tank, the separator, the heater, the cooler, and the adjustment mechanism,
wherein the raw-fuel tank is provided to store the raw fuel,
wherein the heater is provided to heat the raw fuel flowing downstream of the raw-fuel tank and upstream of the separator in a raw-fuel path along which the raw fuel is delivered from the raw-fuel tank to the separator by the raw-fuel delivery device,
wherein the cooler is provided to cool the second fuel flowing downstream of the separator and upstream of the raw-fuel tank in a second-fuel path along which the second fuel is delivered from the separator to the raw-fuel tank, and
wherein the adjustment mechanism is provided to adjust at least one of the flow rate of the raw fuel, a heating amount in the heater, and a cooling amount in the cooler.

* * * * *